United States Patent
Uehara

(10) Patent No.: US 12,392,380 B2
(45) Date of Patent: Aug. 19, 2025

(54) DAMPER DEVICE

(71) Applicant: EXEDY Corporation, Neyagawa (JP)

(72) Inventor: Hiroshi Uehara, Neyagawa (JP)

(73) Assignee: EXEDY Corporation, Neyagawa (JP)

( * ) Notice: Subject to any disclaimer, the term of this patent is extended or adjusted under 35 U.S.C. 154(b) by 435 days.

(21) Appl. No.: 17/994,745

(22) Filed: Nov. 28, 2022

(65) Prior Publication Data
US 2023/0204077 A1 Jun. 29, 2023

(30) Foreign Application Priority Data
Dec. 27, 2021 (JP) .................................. 2021-212616

(51) Int. Cl.
*F16D 3/12* (2006.01)
*F16F 15/129* (2006.01)

(52) U.S. Cl.
CPC .............. *F16D 3/12* (2013.01); *F16F 15/129* (2013.01); *F16D 2300/22* (2013.01)

(58) Field of Classification Search
CPC ....... F16D 3/12; F16D 2300/22; F16F 15/129
USPC ...................................................... 464/68.41
See application file for complete search history.

(56) References Cited

U.S. PATENT DOCUMENTS

| 8,998,728 B2* | 4/2015 | Komuro | F16D 3/14 464/68.41 |
| 11,454,296 B2* | 9/2022 | Saeki | F16F 15/1292 |
| 12,049,937 B2* | 7/2024 | Uehara | F16F 15/13492 |

FOREIGN PATENT DOCUMENTS

JP 2014-214819 B2 11/2014

* cited by examiner

*Primary Examiner* — Greg Binda
(74) *Attorney, Agent, or Firm* — United IP Counselors, LLC

(57) ABSTRACT

A damper device, disposed between an engine and a drive unit, includes an input rotor, an output rotor, an elastic coupling part, and a hysteresis torque generating mechanism. The hysteresis torque generating mechanism generates a hysteresis torque together with the input rotor or the output rotor therebetween. The damper device is in a neutral condition when a torque is not transmitted from both the engine and the drive unit, in a first torsional condition when the torque is transmitted from the engine, and in a second torsional condition when the torque is transmitted from the drive unit. The hysteresis torque generating mechanism is configured not to generate a hysteresis torque when the damper device is in the first torsional condition, and not to generate the hysteresis torque in a first range of torsion angle less than a first angle when the damper device is in the second torsional condition.

2 Claims, 24 Drawing Sheets

DAMPER DEVICE

CROSS-REFERENCE TO RELATED APPLICATIONS

This application claims priority to Japanese Patent Application No. 2021-212616 filed Dec. 27, 2021. The entire contents of that application are incorporated by reference herein in their entirety.

TECHNICAL FIELD

The present invention relates to a damper device.

BACKGROUND ART

A damper device is configured to absorb and attenuate fluctuations of a torque outputted from an engine by one or more coil springs. Specifically, the damper device includes an input rotor, an output rotor, and a plurality of coil springs elastically coupling the input rotor and the output rotor. Besides, another type of damper device has been also proposed that a hysteresis torque is generated by one or more friction materials for further absorbing and attenuating fluctuations of a torque.

For example, a damper device disclosed in Japan Laid-open Patent Application Publication No. 2014-214819 includes a first plate, a second plate, elastic members for elastically coupling the first and second plates, and first and second friction materials. When torsion is caused in the damper device by a torque transmitted thereto from the engine, the first friction material generates a hysteresis torque that is relatively small in magnitude. On the other hand, when torsion is caused to the opposite side in the damper device in engine starting, the second friction material generates a hysteresis torque that is relatively large in magnitude.

The damper device configured as described above poses a drawback of degradation in attenuation performance in a hybrid vehicle when the hybrid vehicle is on standby, with the engine being activated.

It is an object of the present invention to inhibit degradation in attenuation performance.

BRIEF SUMMARY

A damper device according to an aspect of the present invention is disposed between an engine and a drive unit. The damper device includes an input rotor, an output rotor, an elastic coupling part, and a hysteresis torque generating mechanism. The input rotor is disposed to be rotatable. The output rotor is disposed to be rotatable relative to the input rotor. The elastic coupling part elastically couples the input rotor and the output rotor. The hysteresis torque generating mechanism is configured to generate a hysteresis torque together with at least one of the input rotor and the output rotor therebetween. The damper device is configured to be in a neutral condition, a first torsional condition, and a second torsional condition. The neutral condition is a condition of the damper device made when a torque is not transmitted thereto from both the engine and the drive unit. The first torsional condition is a condition of the damper device made when the torque is transmitted thereto from the engine. The second condition is a condition of the damper device made when the torque is transmitted thereto from the drive unit. The hysteresis torque generating mechanism is configured not to generate the hysteresis torque when the damper device is in the first torsional condition. Besides, the hysteresis torque generating mechanism is configured not to generate the hysteresis torque in a first range of torsion angle set to be less than a first angle when the damper device is in the second torsional condition.

As described above, the hysteresis torque generating mechanism does not generate the hysteresis torque in the first torsional condition. Besides, the hysteresis torque generating mechanism does not generate the hysteresis torque in the second torsional condition when the torsion angle falls in the first range set to be less than the first angle. According to this configuration, acute change in hysteresis torque does not occur in switching between the first torsional condition and the second torsional condition; hence, degradation in attenuation performance can be prevented when the engine is on standby. It should be noted that the term "hysteresis torque" means a torque to be generated by sliding of a friction member against another member. For example, a minute torque to be generated in such a situation as sliding of a coil spring against another member is not regarded as the hysteresis torque in the present invention.

Preferably, the hysteresis torque generating mechanism is configured to generate a first hysteresis torque in a second range of torsion angle, which is set to be greater than or equal to the first angle and be less than a second angle, when the damper device is in the second torsional condition.

Preferably, the hysteresis torque generating mechanism is configured to generate a second hysteresis torque greater in magnitude than the first hysteresis torque in a third range of torsion angle, which is set to be greater than or equal to the second angle and be less than a third angle, when the damper device is in the second torsional condition.

Preferably, the hysteresis torque generating mechanism is configured to generate a third hysteresis torque greater in magnitude than the second hysteresis torque in a fourth range of torsion angle, which is set to be greater than or equal to the third angle and be less than or equal to a maximum angle, when the damper device is in the second torsional condition.

Preferably, the hysteresis torque generating mechanism is configured to generate the second hysteresis torque greater in magnitude than the first hysteresis torque in the third range and not to generate the hysteresis torque in a predetermined minute torsion angular range included in the third range when the damper device is in the second torsional condition.

Overall, according to the present invention, degradation in attenuation performance can be inhibited.

DETAILED DESCRIPTION

[Entire Configuration]

Figure 1:
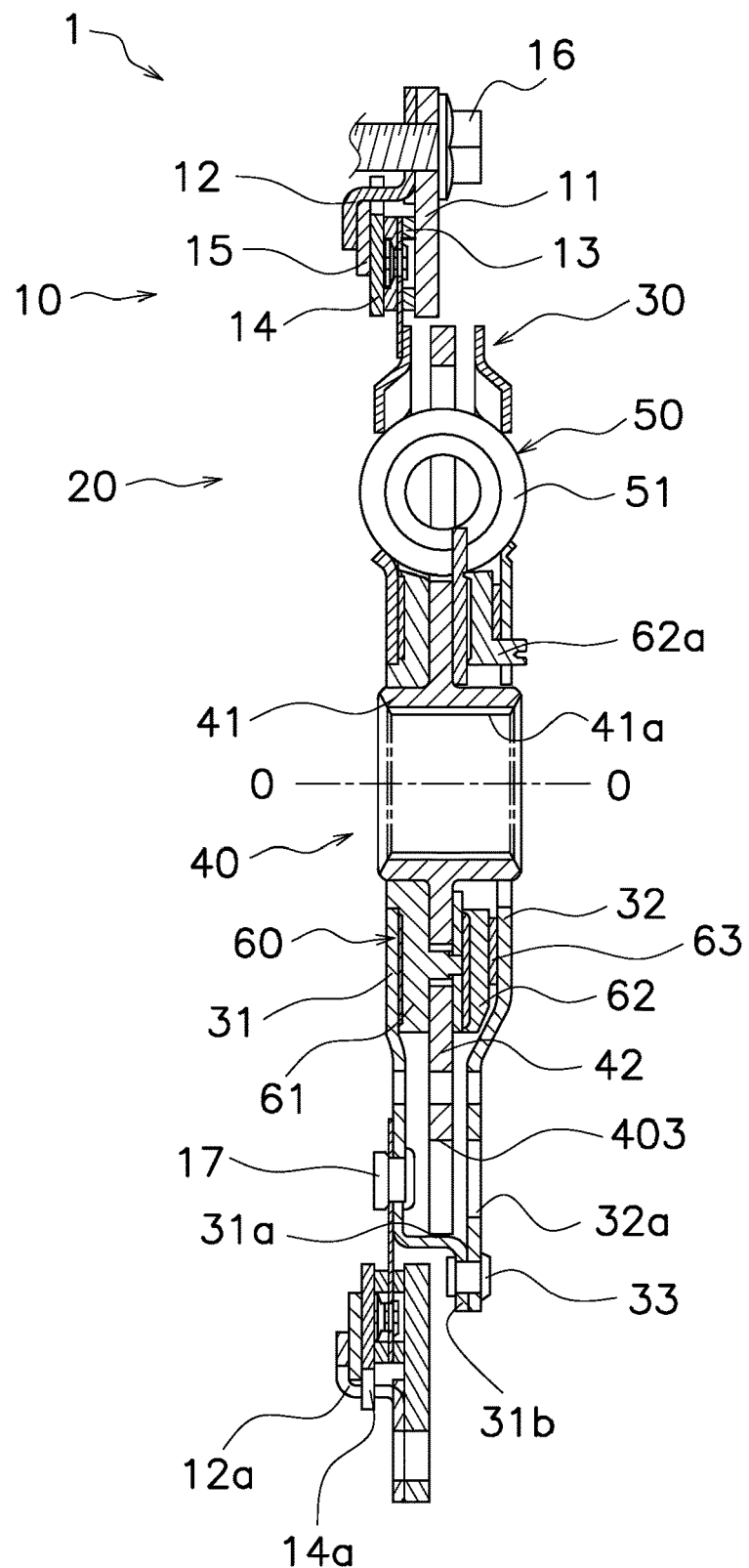
FIG. 1 is a cross-sectional view of a damper device.
Figure 2:
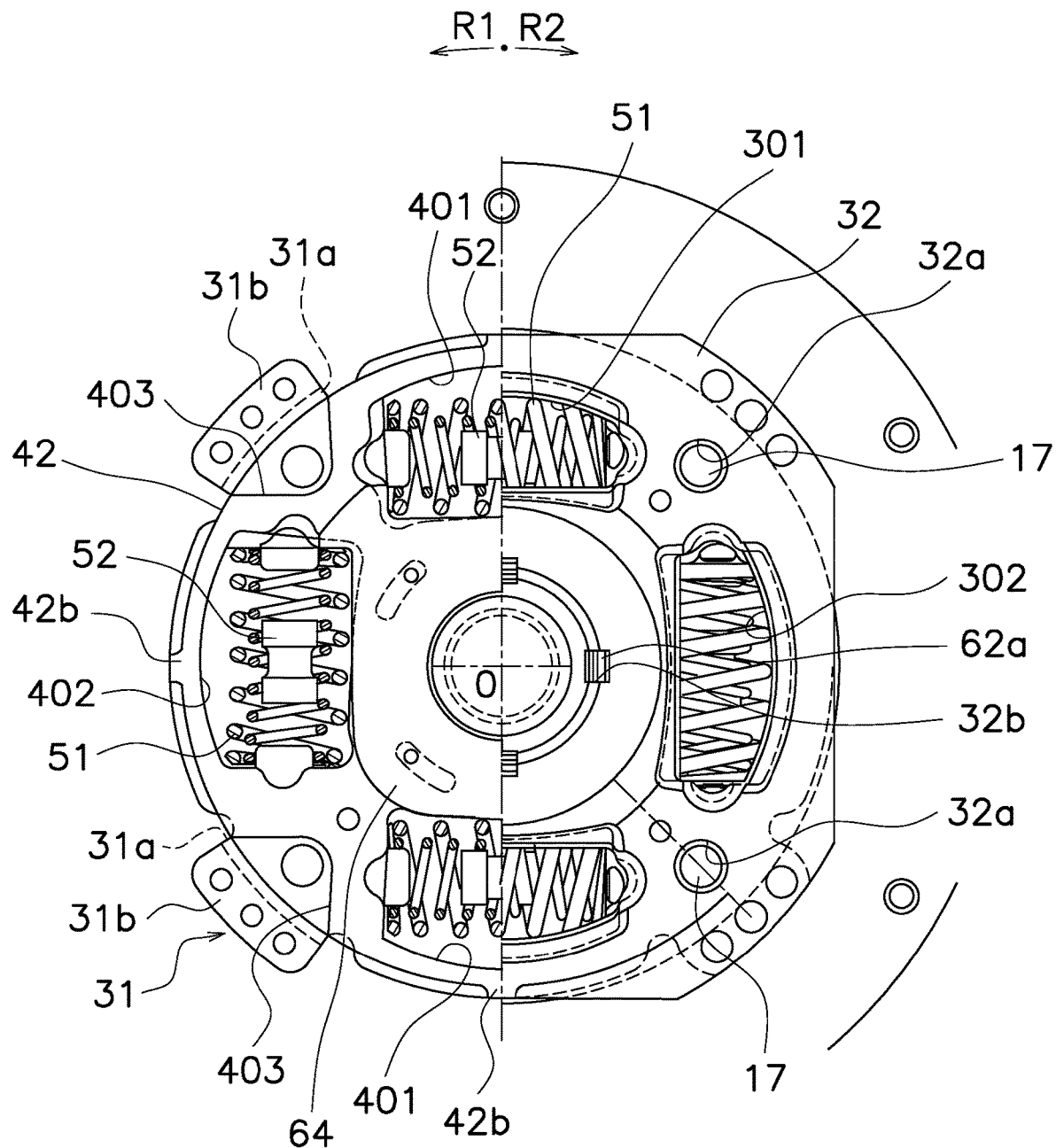
FIG. 2 is a front view of the damper device.

FIG. 1 is a cross-sectional view of a torque limiter embedded damper device 1 (hereinafter simply referred to as "damper device 1") according to a preferred embodiment of the present invention. On the other hand, FIG. 2 is a front view of the damper device 1, from part of which some constituent members are detached. In FIG. 1, an engine (not shown in the drawing) is disposed on the left side of the damper device 1, whereas a drive unit (not shown in the drawing), including an electric motor, a transmission, and so forth, is disposed on the right side of the damper device 1.

It should be noted that in the following explanation, the term "axial direction" refers to an extending direction of a rotational axis O of the damper device 1. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O. Likewise, the radial direction is not required to be perfectly matched with a diameter direction of the imaginary circle about the rotational axis O. Besides, the term "torsion angle" means an angle of torsion (relative rotation) of an input rotor 30 with respect to a hub flange 40.

As shown in FIG. 1, the damper device 1 is configured to transmit a torque between a flywheel (not shown in the drawing) and an input shaft (not shown in the drawing) of the drive unit. The damper device 1 is disposed between the engine and the drive unit. The damper device 1 is a device for limiting the torque transmitted between the engine and the drive unit, and simultaneously, for attenuating rotational fluctuations. The damper device 1 includes a torque limiter unit 10 and a damper unit 20. The damper device 1 is rotated in a first rotational direction when transmitting the torque outputted from the engine toward the drive unit.

[Torque Limiter Unit 10]

The torque limiter unit 10 is disposed radially outside the damper unit 20. The torque limiter unit 10 limits the torque transmitted between the flywheel and the damper unit 20. The torque limiter unit 10 includes a cover plate 11, a support plate 12, a friction disc 13, a pressure plate 14, and a cone spring 15.

The cover plate 11 and the support plate 12 are disposed away from each other at a predetermined interval in the axial direction. The outer peripheral part of the cover plate 11 and that of the support plate 12 are fixed to the flywheel by a plurality of bolts 16.

The friction disc 13, the pressure plate 14, and the cone spring 15 are disposed axially between the cover plate 11 and the support plate 12.

The friction disc 13 includes a core plate and a pair of friction members fixed to both lateral surfaces of the core plate. The friction disc 13 is fixed at an inner peripheral part thereof to the damper unit 20 by a plurality of rivets 17. The pressure plate 14 and the cone spring 15 are disposed between the friction disc 13 and the support plate 12.

The pressure plate 14 is made in shape of an annulus. The pressure plate 14 is disposed on the support plate 12 side of the friction disc 13. It should be noted that the pressure plate 14 is provided with a plurality of pawls 14a on the outer peripheral part thereof. The pawls 14a are engaged with a plurality of engaging holes 12a provided in the support plate 12, respectively.

The cone spring 15 is disposed between the pressure plate 14 and the support plate 12. The cone spring 15 presses the friction disc 13 against the cover plate 11 through the pressure plate 14.

[Damper Unit 20]

The damper unit 20 includes the input rotor 30, the hub flange 40 (exemplary output rotor), an elastic coupling part 50, and a hysteresis torque generating mechanism 60.

<Input Rotor 30>

As shown in FIGS. 1 and 2, the input rotor 30 is disposed to be rotatable. The input rotor includes a first plate 31 and a second plate 32. Each of the first and second plates 31 and 32 is made in shape of a disc provided with a hole in the center part thereof. The first and second plates 31 and 32 are disposed apart from each other at an interval in the axial direction.

Each of the first and second plates 31 and 32 includes a pair of first support portions 301 and a pair of second support portions 302. The first support portions 301 of the first plate 31 are provided in identical positions to those of the second plate 32. Likewise, the second support portions 302 of the first plate 31 are provided in identical positions to those of the second plate 32. The second plate 32 is provided with assembling holes 32a in corresponding positions to the rivets 17.

The first plate 31 includes a plurality of stopper portions 31a and a plurality of fixation portions 31b. The stopper portions 31a and the fixation portions 31b are disposed in the outer peripheral part of the first plate 31.

The stopper portions 31a extend axially toward the second plate 32. The stopper portions 31a are formed by bending the outer peripheral part of the first plate 31 toward the second plate 32.

The fixation portions 31b are formed by bending the distal ends of the stopper portions 31a radially outward. The fixation portions 31b are fixed to the outer peripheral end of the second plate 32 by a plurality of rivets 33. Because of this, the first and second plates 31 and 32 are non-rotatable relative to each other and are axially immovable from each other.

The first support portions 301, provided as a pair in the first plate 31, are disposed apart from each other at an angular interval of 180° about the rotational axis O. Besides, in the first plate 31, each second support portion 302 is disposed apart from each first support portion 301 at an angular interval of 90°. In the second plate 32, the first support portions 301 and the second support portions 302 are also disposed in similar positions to those in the first plate 31. Each support portion 301, 302 includes a hole axially penetrating therethrough and an edge part formed by cutting and raising the inner and outer peripheral edges of the hole.

As schematically shown in FIGS. 3A to 3D, each support portion 301, 302 includes an R1 support surface 301a, 302a on one end thereof located on the first rotational direction side (hereinafter simply referred to as "R1 side") and includes an R2 support surface 301b, 302b on the other end thereof located on a second rotational direction side (hereinafter simply referred to as "R2 side"). In each support portion 301, 302, the width of the hole (distance between the R1 and R2 support surfaces) is L.

It should be noted that in FIGS. 3A to 3D, the first and second support portions 301 and 302 are depicted with solid line, whereas first and second accommodation portions 401 and 402 (to be described) of the hub flange 40 are depicted with dashed-dotted line. It should be also noted that each FIG. 3A, 3B, 3C, 3D is a schematic diagram; constituent elements therein are different from those shown in actual specific shape in FIG. 2.

<Hub Flange 40>

As shown in FIGS. 1 and 2, the hub flange 40 includes a hub 41 and a flange 42. The hub 41 and the flange 42 are integrated with each other as a single member. The hub flange 40 is rotatable relative to the input rotor 30 in a predetermined angular range. The hub 41 has a tubular shape and is provided with a spline hole 41a in the center part thereof. Besides, the hub 41 penetrates both holes provided in the center parts of the first and second plates 31 and 32.

The flange 42 has a disc shape and extends radially outward from the outer peripheral surface of the hub 41. The flange 42 is disposed axially between the first and second plates 31 and 32.

The flange 42 includes a plurality of stopper protrusions 42b, the pair of first accommodation portions 401, the pair of second accommodation portions 402, and a plurality of cutouts 403.

The stopper protrusions 42b are shaped to protrude radially outward from the outer peripheral surface of the flange 42. Each stopper protrusion 42b is provided in a position located radially outside the circumferential middle of each accommodation portion 401, 402. Now, when the input rotor 30 and the hub flange 40 are rotated relative to each other, the stopper protrusions 42b contact with the stopper portions 31a of the first plate 31; accordingly, relative rotation is prevented between the input rotor 30 and the hub flange 40.

Figure 3A:
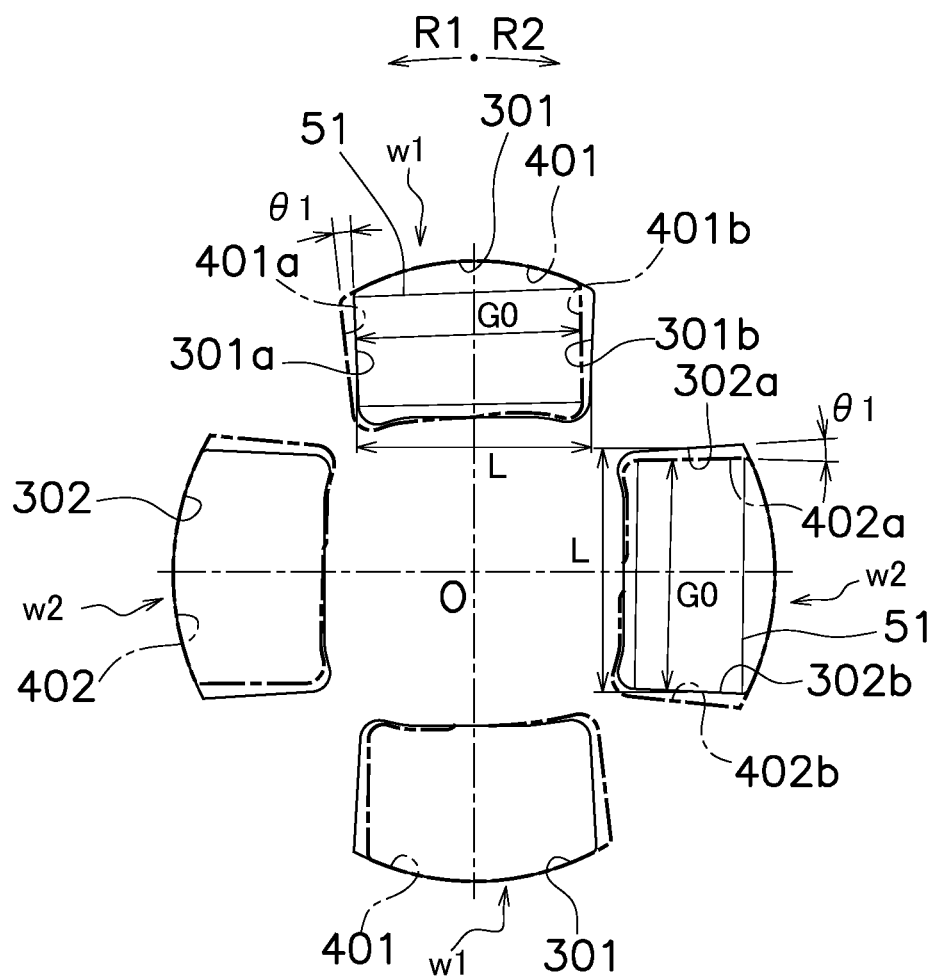
FIG. 3 A is a schematic diagram showing a relation between an input rotor and a hub flange.
FIG. 3B is a schematic diagram showing a condition that torsion (relative rotation) of the input rotor with respect to the hub flange is caused to an R1 side by an angle θ1.
FIG. 3C is a schematic diagram showing a condition that the torsion of the input rotor with respect to the hub flange is caused to the R1 side by an angle θ3.
FIG. 3D is a schematic diagram showing a condition that the torsion of the input rotor with respect to the hub flange is caused to an R2 side by the angle θ1.

As shown in FIG. 3A, the pair of first accommodation portions 401 is disposed in corresponding positions to each pair of first support portions 301. On the other hand, the pair of second accommodation portions 402 is disposed in corresponding positions to each pair of second support portions 302. When explained in more detail, in a neutral condition (at a torsion angle of 0°) that the angle of relative rotation between the input rotor 30 and the hub flange 40 is 0°, and in other words, torsion is not caused between the input rotor 30 and the hub flange 40, as shown in FIG. 3A, the pair of first accommodation portions 401 is disposed to overlap in part each pair of first support portions 301, and simultaneously, be offset (or displaced) from each pair of first support portions 301 to the R1 side by an angle θ1 (e.g., a torsion angle of 2°) as seen in the axial direction. On the other hand, the pair of second accommodation portions 402 is disposed to overlap in part each pair of second support portions 302, and simultaneously, be offset (or displaced) from each pair of second support portions 302 to the R2 side by the identical angle θ1 to the above as seen in the axial direction.

Each accommodation portion 401, 402 is a hole made in shape of an approximately rectangle, the outer peripheral part of which is made in shape of a circular arc, as seen in the axial direction. Each accommodation portion 401, 402 includes an R1 accommodation surface 401a, 402a on one end thereof located on the R1 side and includes an R2 accommodation surface 401b, 402b on the other end thereof located on the R2 side. In each accommodation portion 401, 402, the width of the hole (distance between the R1 accommodation surface 401a, 402a and the R2 accommodation surface 401b, 402b) is set to be L in similar manner to the width of the hole in each support portion 301, 302.

As shown in FIG. 2, each cutout 403 is disposed between the first and second accommodation portions 401 and 402 circumferentially adjacent to each other. Each cutout 403 is recessed radially inward from the outer peripheral surface of the flange 42 at a predetermined depth. The cutouts 403 are provided in corresponding positions to the rivets 17 by which the first plate 31 and the friction disc 13 of the torque limiter unit 10 are coupled to each other. Therefore, the torque limiter unit 10 and the damper unit 20, assembled in different steps, can be fixed to each other by the rivets 17 with use of the assembling holes 32a of the second plate 32 and the cutouts 403 of the flange 42.

<Elastic Coupling Part 50>

As shown in FIGS. 1 and 2, the elastic coupling part 50 elastically couples the input rotor and the hub flange 40. The elastic coupling part 50 includes a plurality of coil springs 51 and a plurality of resin members 52. It should be noted that the elastic coupling part 50 may not include the plural resin members 52.

Each coil spring 51 includes an outer spring and an inner spring. Each coil spring 51 is disposed in each accommodation portion 401, 402 of the flange 42. Each coil spring 51 is supported in both radial and axial directions by each axially opposed pair of support portions 301, 302 of the input rotor 30. The coil springs 51 are actuated in parallel.

Incidentally, the coil springs 51 are equal in free length to each other. The free length of each coil spring 51 is equal to the width L of each support portion 301, 302, i.e., the width L of each accommodation portion 401, 402. Besides, the coil springs 51 are equal in stiffness to each other. The resin members 52 are equal in stiffness to each other.

<Accommodation States of Coil Springs 51>

Now, a layout of the support portions 301 and 302 and the accommodation portions 401 and 402 and an accommodation state of each coil spring 51, which are made in the neutral condition, will be hereinafter explained in detail. It should be noted that in the following explanation, on an as-needed basis, a combination of each axially opposed pair of first support portions 301 and each first accommodation portion 401 will be referred to as "first window set w1", whereas a combination of each axially opposed pair of second support portions 302 and each second accommodation portion 402 will be referred to as "second window set w2".

As described above, in the neutral condition as shown in FIG. 3A, each first accommodation portion 401 is offset to the R1 side by the angle θ1 from each axially opposed pair of first support portions 301 corresponding thereto. On the other hand, each second accommodation portion 402 is offset to the R2 side by the angle θ1 from each axially opposed pair of second support portions 302 corresponding thereto. Besides, each coil spring 51 is attached in a compressed state to an opening (axially penetrating hole) formed by axial overlap between each axially opposed pair of support portions 301, 302 and each accommodation portion 401, 402 corresponding thereto.

Specifically, in the neutral condition as shown in FIG. 3A, in each of the pair of first window sets w1, the coil spring 51 is in contact at the R1-side end surface thereof with the R1 support surfaces 301a, while in contact at the R2-side end surface thereof with the R2 accommodation surface 401b. In other words, in the neutral condition, in each first window set w1, the coil spring 51 is in contact at the R1-side end surface thereof with the input rotor 30, while not in contact thereat with the hub flange 40. Besides, in the neutral condition, in each first window set w1, the coil spring 51 is in contact at the R2-side end surface thereof with the hub flange 40, while not in contact thereat with the input rotor 30.

In each of the pair of second window sets w2, the coil spring 51 is in contact at the R1-side end surface thereof with the R1 accommodation surface 402a, while in contact at the R2-side end surface thereof with the R2 support surfaces 302b. In other words, in the neutral condition, in each second window set w2, the coil spring 51 is in contact at the R1-side end surface thereof with the hub flange 40, while not in contact thereat with the input rotor 30. Besides, in the neutral condition, in each second window set w2, the coil spring 51 is in contact at the R2-side end surface thereof with the input rotor 30, while not in contact thereat with the hub flange 40.

<Hysteresis Torque Generating Mechanism 60>

Figure 4:
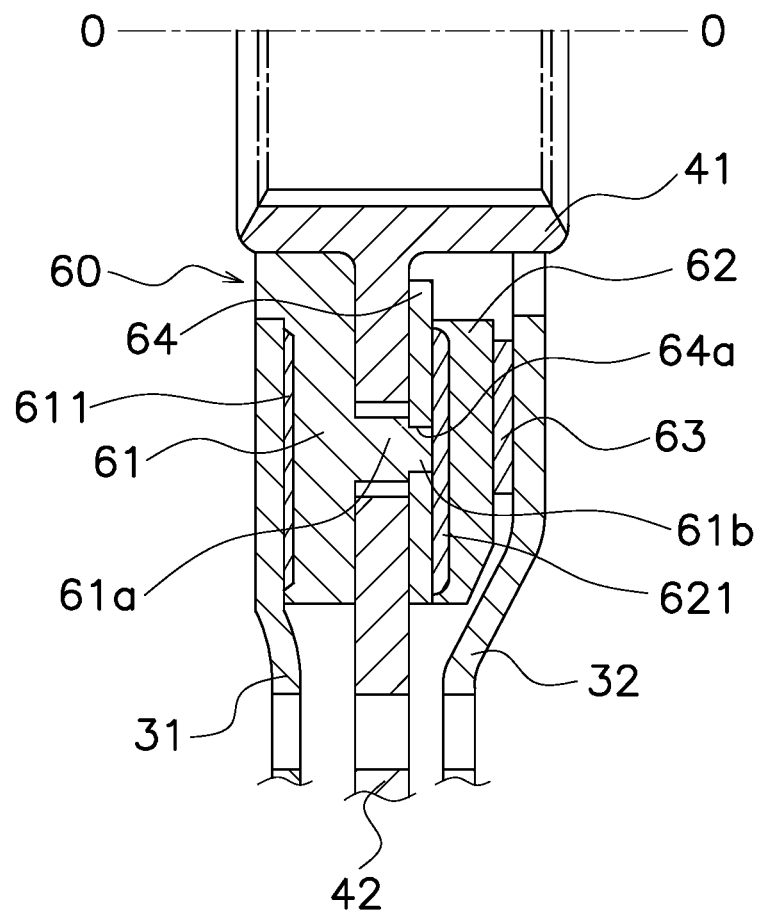
FIG. 4 is a close-up view of a hysteresis torque generating mechanism.

As shown in FIGS. 1 and 4, the hysteresis torque generating mechanism 60 includes a first bushing 61, a second bushing 62, a cone spring 63, and a friction plate 64. The hysteresis torque generating mechanism 60, together with the input rotor 30, generates a hysteresis torque therebetween.

The hysteresis torque generating mechanism 60 generates the hysteresis torque when rotated relative to the input rotor 30. Specifically, as explained below, the hysteresis torque generating mechanism 60 generates the hysteresis torque when both the first bushing 61 and the friction plate 64 are rotated relative to the input rotor 30. It should be noted that FIG. 4 is a partial close-up view of FIG. 1.

The first bushing 61 is disposed axially between the first plate 31 and the flange 42. The second bushing 62, the cone spring 63, and the friction plate 64 are disposed axially between the second plate 32 and the flange 42. It should be noted that the friction plate 64 is disposed axially between the flange 42 and the second bushing 62, whereas the cone spring 63 is disposed axially between the second plate 32 and the second bushing 62.

The first bushing 61 is rotatable relative to the first plate 31. Besides, the first bushing 61 is rotatable relative to the flange 42. The first bushing 61 is provided with a friction member 611 fixed to the first plate 31-side surface thereof. Because of this, when the first bushing 61 is rotated relative to the first plate 31, the hysteresis torque is generated.

The first bushing 61 and the friction plate 64 are rotated unitarily with each other. When described in detail, as shown in FIG. 4, the first bushing 61 includes a plurality of restriction protrusions 61a and a plurality of engaging protrusions 61b. The engaging protrusions 61b are engaged with engaging holes 64a provided in the friction plate 64. Therefore, the first bushing 61 and the friction plate 64 are non-rotatable relative to each other and are rotated unitarily with each other.

Figure 5:
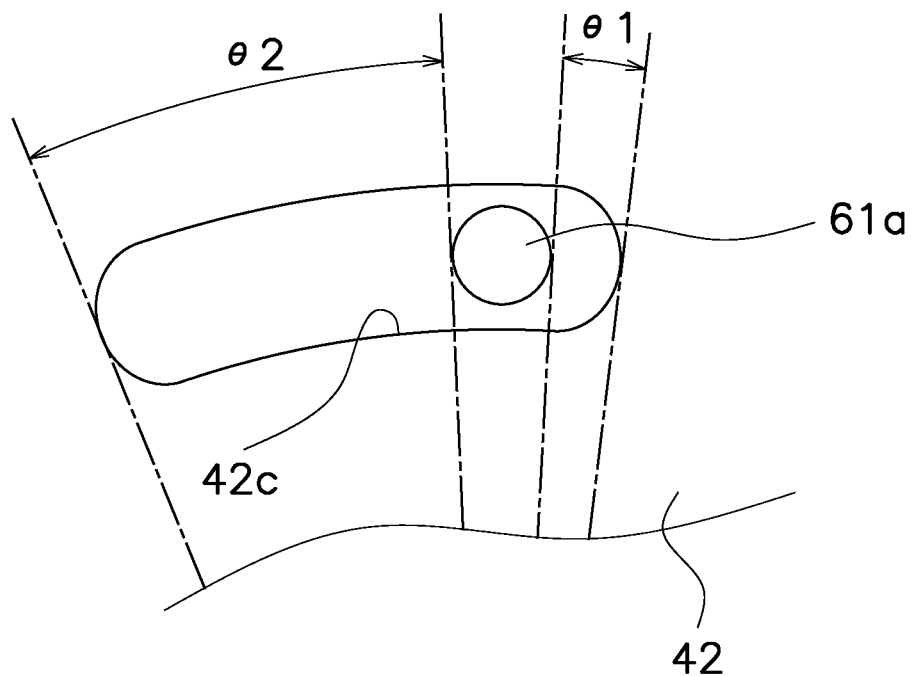
FIG. 5 is a close-up front view for showing a relation between a restriction protrusion and an elongated hole.

The restriction protrusions 61a are shaped to axially protrude from the flange 42-side lateral surface of the first bushing 61. As shown more close-up in FIG. 5 (partial front view), the restriction protrusions 61a penetrate elongated holes 42c, respectively. The elongated holes 42c are provided in the flange 42 so as to extend in the circumferential direction.

In the neutral condition, gaps are produced on both R1 and R2 sides of each restriction protrusion 61a in each elongated hole 42c, i.e., between each restriction protrusion 61a and the circumferential end surfaces of each elongated hole 42c. It should be noted that the R2-side gap corresponds to a torsion angle θ1. In other words, the R2-side gap is equal in magnitude to the amount of offset between each accommodation portion 401, 402 and each axially opposed pair of support portions 301, 302. The R1-side gap corresponds to a torsion angle θ2. It should be noted that the torsion angle θ2 is sufficiently greater than the torsion angle θ1. Because of this, even when torsion is caused to the R1 side in use of the damper device 1, each restriction protrusion 61a does not contact with the R1-side end surface of each elongated hole 42c. It should be noted that the position of the first bushing 61 and the friction plate 64 in the neutral condition will be referred to as "neutral position".

As shown in FIG. 4, the second bushing 62 is rotatable relative to the friction plate 64. The second bushing 62 is provided with a friction member 621 fixed to the friction plate 64-side surface thereof. Because of this, when the second bushing 62 is rotated relative to the friction plate 64, the hysteresis torque is generated. It should be noted that the cone spring 63 is disposed axially between the second bushing 62 and the second plate 32, while being compressed therebetween. In other words, the cone spring 63 urges the second bushing 62 toward the friction plate 64.

The second bushing 62 is rotated unitarily with the second plate 32. When described in detail, the second bushing 62 is provided with a plurality of engaging protrusions 62a (see FIG. 2) axially protruding from the second plate 32-side surface thereof. The engaging protrusions 62a are engaged with engaging holes 32b of the second plate 32, respectively. Therefore, the second bushing 62 and the second plate 32 are unitarily rotated.

With the configuration described above, the first bushing 61 and the friction plate 64 are rotatable relative to the hub flange 40 by the angle θ2 to the R1 side and are also rotatable relative thereto by the angle θ1 to the R2 side. Therefore, basically, frictional contact is not caused between the first bushing 61 and the first plate 31 in the torsion angular range described above; a hysteresis torque is not generated therebetween. Besides, in the torsion angular range described above, the friction plate 64 is rotated in synchronization with the first plate 31. Hence, similarly to the above, frictional contact is not caused between the second bushing 62 and the friction plate 64; a hysteresis torque is not generated therebetween.

On the other hand, when the torsion angle positively or negatively exceeds the torsion angles described above, the first bushing 61 and the friction plate 64 are prevented from being rotated relative to the flange 42. Therefore, frictional contact is caused between the first bushing 61 and the first plate 31 and between the second bushing 62 and the friction plate 64; hysteresis torques are generated therebetween.

Figure 6:
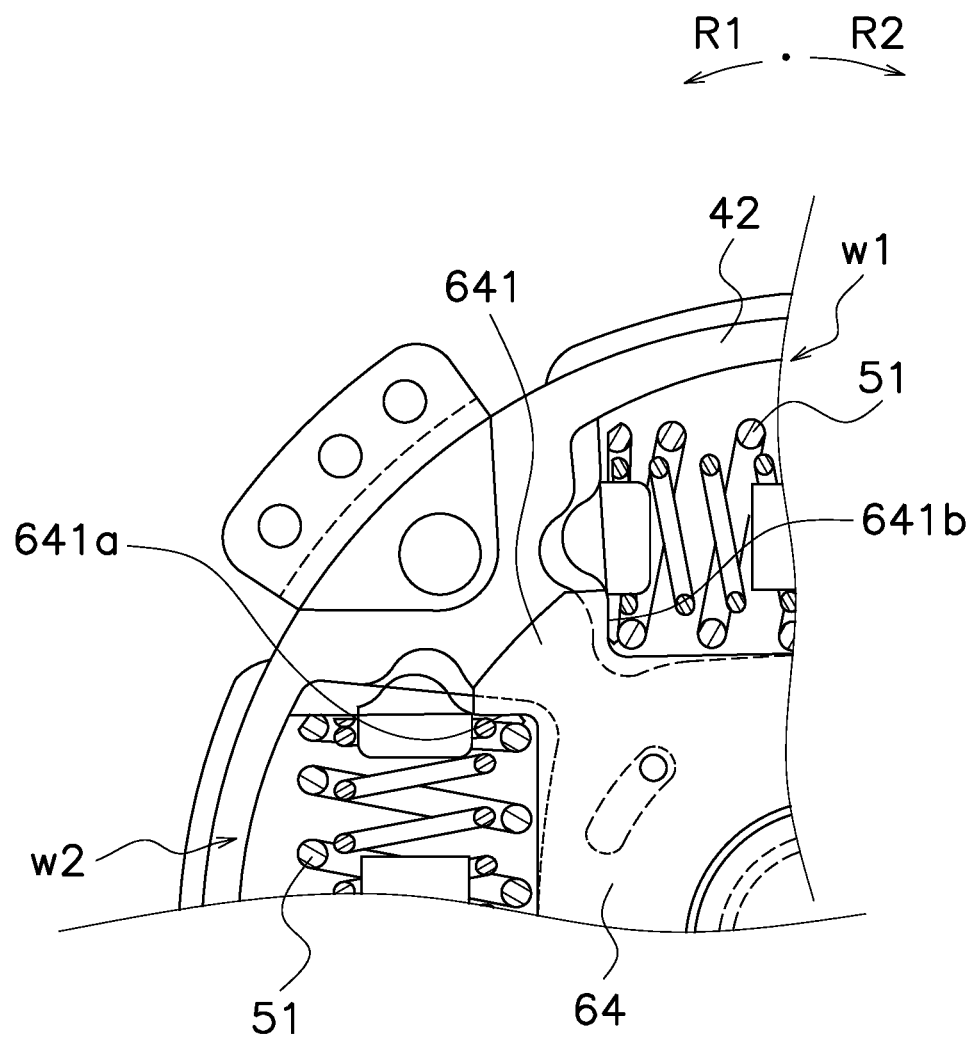
FIG. 6 is a partial close-up view of FIG. 2.

As shown in FIG. 2 and FIG. 6 that is a partial close-up view of FIG. 2, the friction plate 64 herein has a rectangular shape as seen from the front side. Besides, the friction plate 64 includes a pair of protruding portions 641. The protruding portions 641 protrude radially outward from the outer peripheral surface of the friction plate 64. The protruding portions 641 are disposed in positions opposite to each other through the rotational axis O.

Each protruding portion 641 is located circumferentially between adjacent first and second window sets w1 and w2. Besides, each protruding portion 641 is in contact at an R1-side contact surface 641a thereof with the R2-side end surface of the coil spring 51 disposed in the compressed state in the second window set w2. On the other hand, each protruding portion 641 is in contact at an R2-side contact surface 641b thereof with the R1-side end surface of the coil spring 51 disposed in the compressed state in the first window set w1.

As described above, each protruding portion 641 of the friction plate 64 is pressed in opposite directions by the pair of compressed coil springs 51. Therefore, in the neutral condition, the friction plate 64 and the first bushing 61 rotated in synchronization therewith are configured to be constantly set in the neutral position.

[Torsional Characteristics: without Hysteresis Torque]

Figure 7:
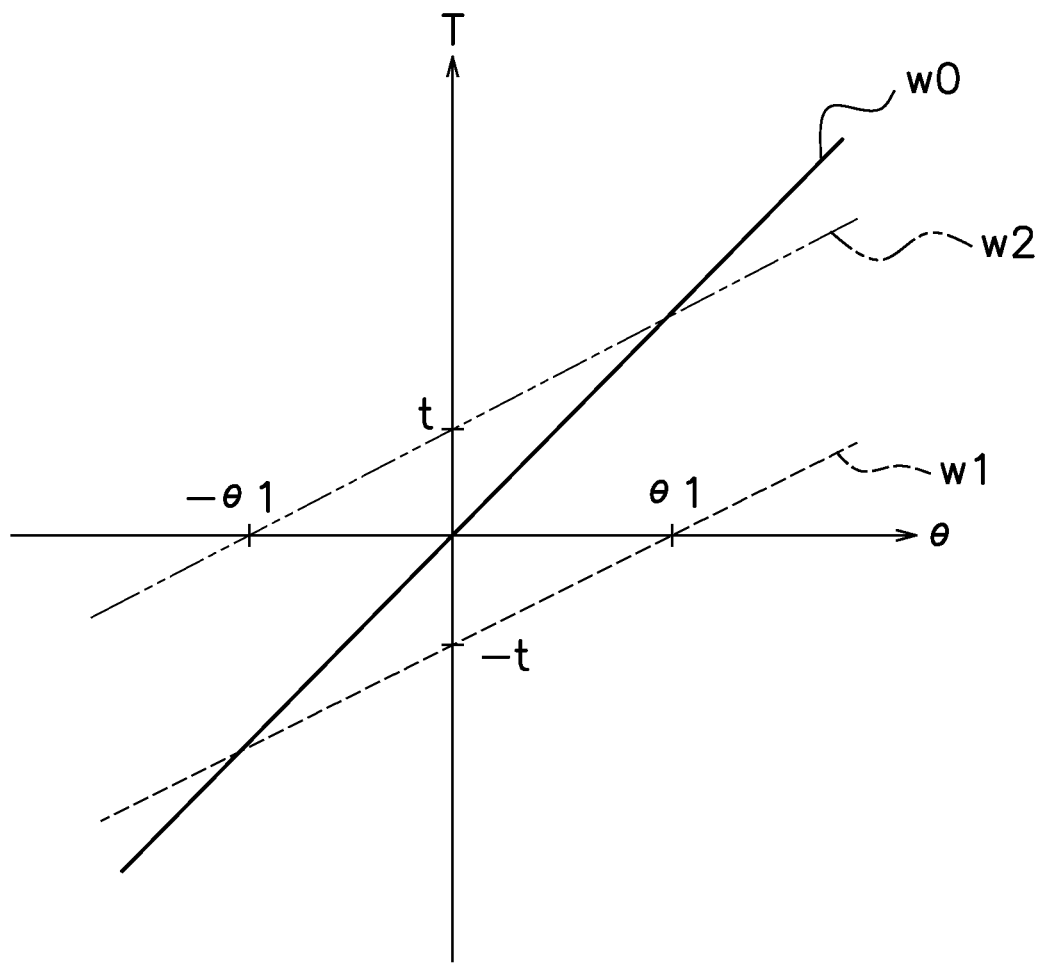
FIG. 7 is a chart showing torsional characteristics.

First, torsional characteristics, exerted by the four coil springs 51 in a condition without hysteresis torque, will be herein explained for easy explanation of actions. In FIG. 7, broken line represents a torsional characteristic (w1) of the coil springs 51 in the first window sets w1; dashed two-dotted line represents a torsional characteristic (w2) of the coil springs 51 in the second window sets w2; solid line represents a net torsional characteristic (w0) of the torsional characteristic (w1) and the torsional characteristic (w2).

Figure 3B:
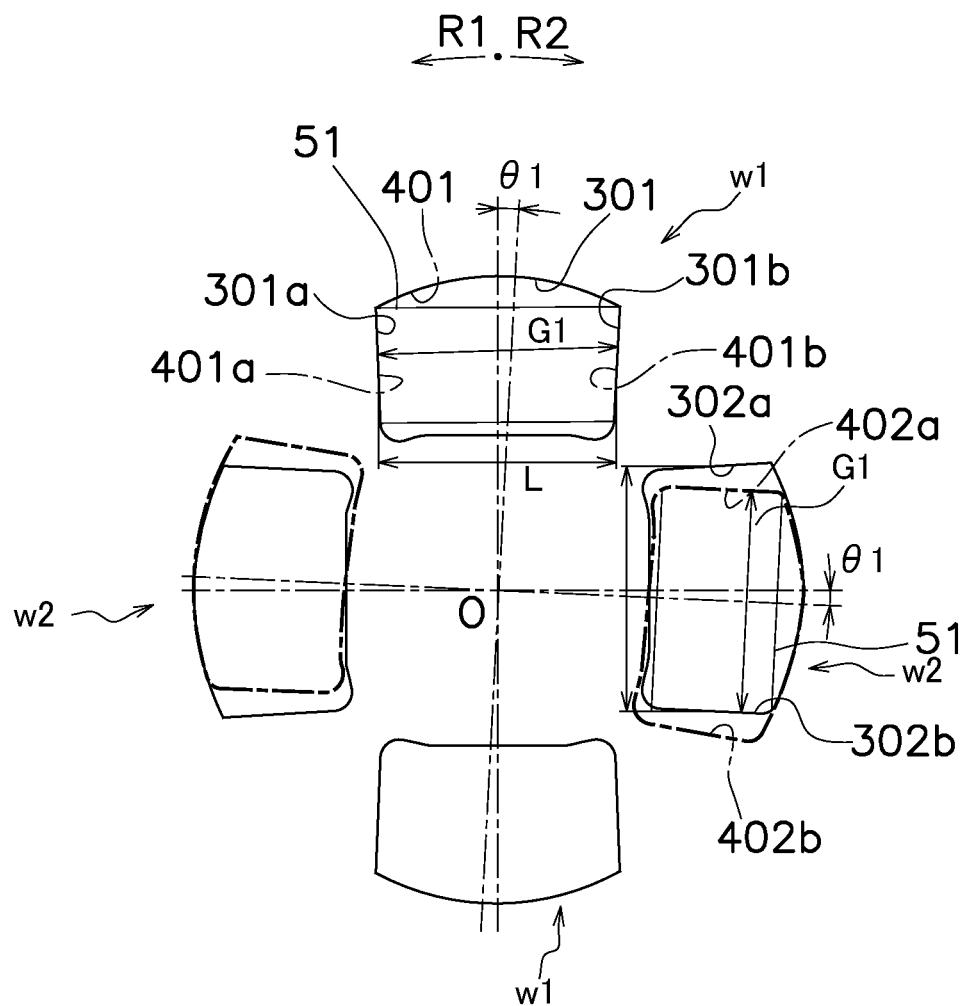
Figure 3C:
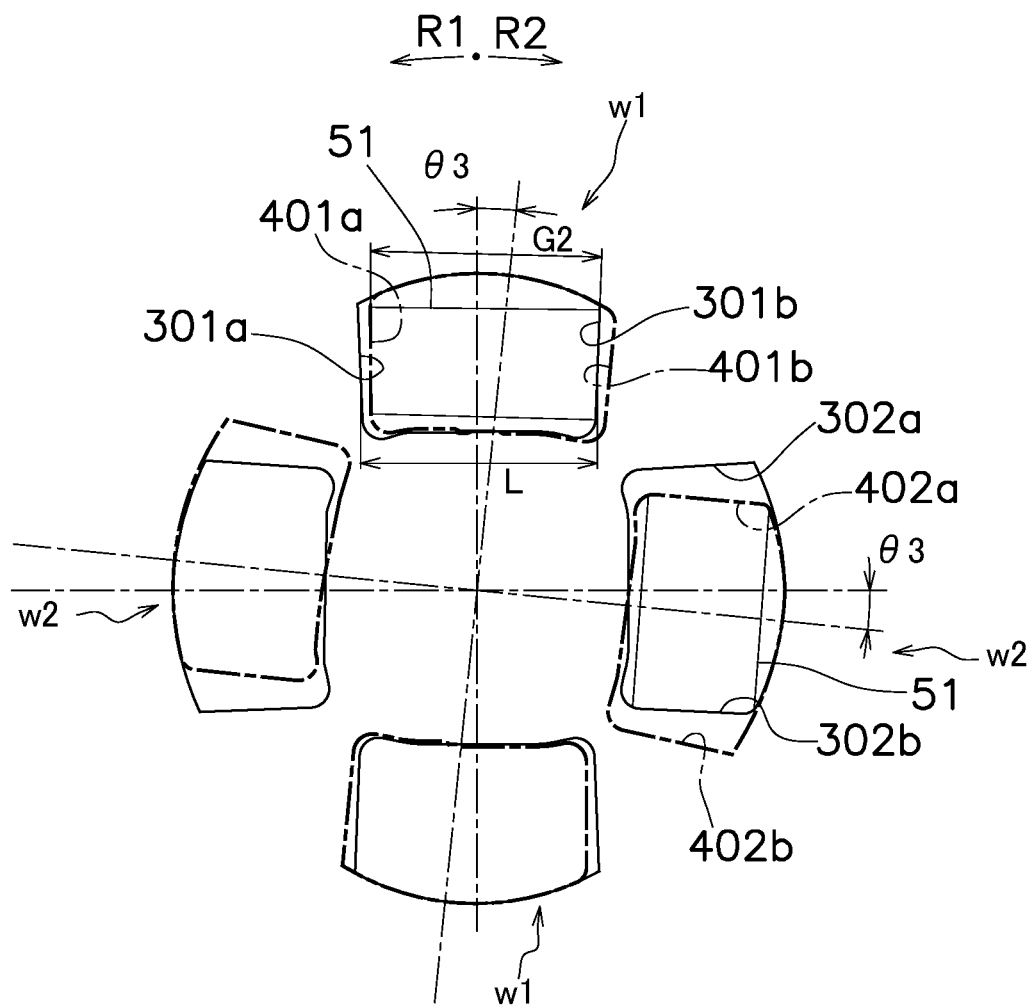
Figure 3D:
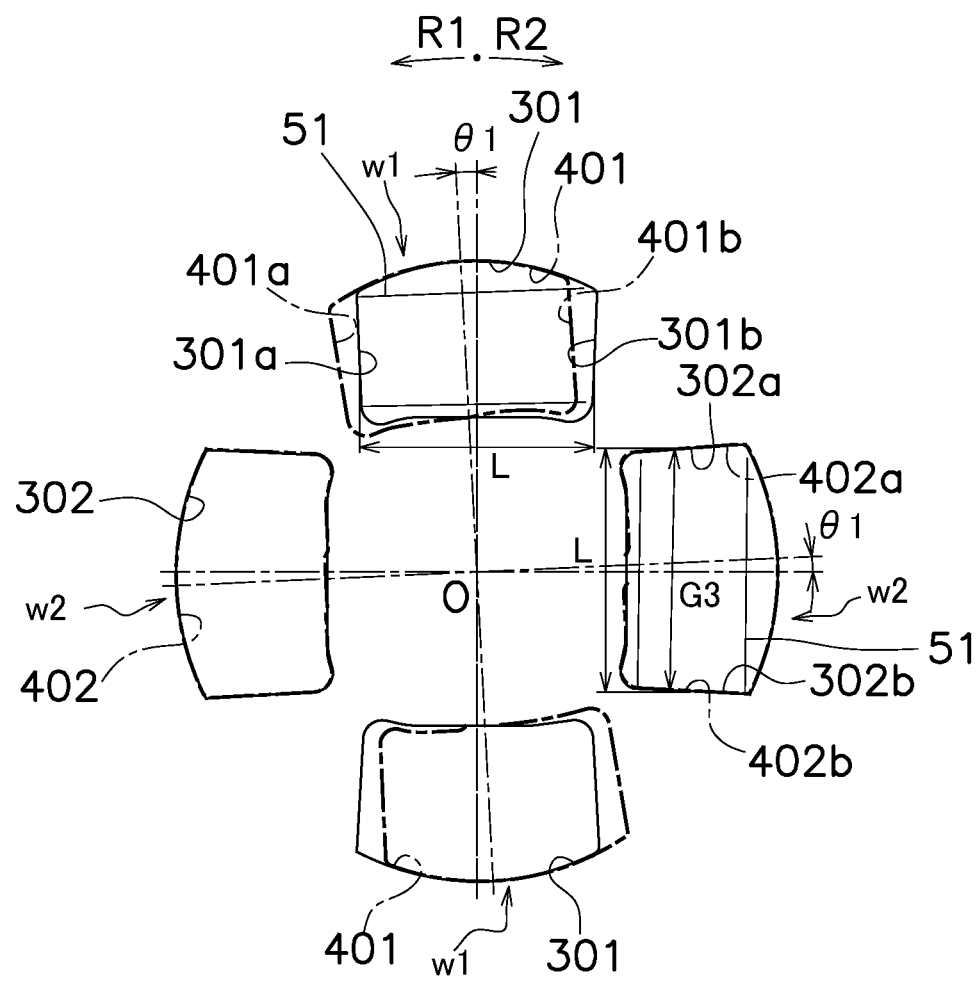

The damper device 1 is configured to be set to a neutral condition, a first torsional condition, and a second torsional condition. FIG. 3A is a schematic diagram of the damper device 1 in the neutral condition; FIGS. 3B and 3C are schematic diagrams of the damper device 1 in the first torsional condition; FIG. 3D is a schematic diagram of the damper device 1 in the second torsional condition. It should be noted that the neutral condition means a condition of the damper device 1 made when a torque is not transmitted to the damper device 1 from both the engine and the drive unit. On the other hand, the first torsional condition means a condition of the damper device 1 made when a torque is transmitted to the damper device 1 from the engine, whereby torsion of the input rotor 30 with respect to the hub flange 40 is caused to the R1 side. By contrast, the second torsional condition means a condition of the damper device 1 made when a torque is transmitted to the damper device 1 from the drive unit, whereby torsion of the input rotor 30 with respect to the hub flange 40 is caused to the R2 side.

<First Window Sets w1>

As shown in FIG. 3A, in the neutral condition without relative rotation between the input rotor 30 and the hub flange 40, the coil spring 51 in each first window set w1 is disposed in the compressed state between the R1 support surfaces 301a and the R2 accommodation surface 401b. The interval between the R1 support surfaces 301a and the R2 accommodation surface 401b is G0 and is narrower than the width L (equal to the free length of the coil spring 51) in each of each axially opposed pair of support portions 301, 302 and each accommodation portion 401, 402. Therefore, as depicted with broken line in FIG. 7, in the first window sets w1, a torsional torque −t is generated by the compressed coil springs 51.

As shown in FIG. 3B, when the torque is inputted to the damper device 1 from the engine, the damper device 1 is set to the first torsional condition. In other words, torsion of the hub flange 40 with respect to the input rotor 30 is caused from the neutral condition to the R2 side (corresponding to the positive side in the torsional characteristics) by the angle θ1. In this condition, the amount of offset between each axially opposed pair of first support portions 301 and each first accommodation portion 401 becomes "0".

Here, in each first window set w1, the interval between the R1 support surfaces 301a in contact with the R1-side end surface of the coil spring 51 and the R2 accommodation surface 401b in contact with the R2-side end surface of the coil spring 51 is G1 and becomes wider than the interval G0. The interval G1 is equal in magnitude to the free length of the coil spring 51. In other words, when the torsion angle between the input rotor 30 and the hub flange 40 reaches +θ1, the coil spring 51 in each first window set w1 becomes a free-length state, whereby the torsional torque becomes "0" as shown in FIG. 7.

Moreover, when torsion of the hub flange 40 with respect to the input rotor 30 is caused at a greater torsion angle than θ1, as shown in FIG. 3C (in which a condition made at a torsion angle θ3 (>θ1) is shown), the coil spring 51 in each first window set w1 is in contact at the R1-side end surface thereof with the R1 accommodation surface 401a, while in contact at the R2-side end surface thereof with the R2 support surfaces 301b. Here, the interval between the R1 accommodation surface 401a and the R2 support surfaces 301b is G2 and becomes narrower than the free length of the coil spring 51. In other words, when the torsion angle between the input rotor 30 and the hub flange 40 becomes greater than θ1, the coil spring 51 is compressed from the free-length state, whereby the torsional torque gradually increases as shown in FIG. 7.

On the other hand, when the damper device 1 is set to the second torsional condition as shown in FIG. 3D, in other words, when torsion of the hub flange 40 with respect to the input rotor 30 is caused from the neutral condition to the R1 side (corresponding to the negative side in the torsional characteristics), the coil spring 51 in each first window set w1 is constantly compressed between the R1 support surfaces 301a and the R2 accommodation surface 401b. In other words, in the first window sets w1, the torsional torque increases to the negative side with increase in torsion angle to the negative side in a negative-side torsional range as shown in FIG. 7.

<Second Window Sets w2>

As shown in FIG. 3A, in the neutral condition, the coil spring 51 in each second window set w2 is disposed in the compressed state between the R1 accommodation surface 402a and the R2 support surfaces 302b. The interval between the R1 accommodation surface 402a and the R2 support surfaces 302b is G0 and is narrower than the width L (equal to the free length of the coil spring 51) in each of each axially opposed pair of support portions 301, 302 and each accommodation portion 401, 402. Therefore, as depicted with dashed two-dotted line in FIG. 7, in the neutral condition, a torsional torque +t is generated by the compressed coil springs 51 in the second window sets w2.

As shown in FIGS. 3B and 3C, when the damper device 1 is set to the first torsional condition, the coil springs 51 in each second window set w2 is constantly compressed between the R1 accommodation surface 402a and the R2 support surfaces 302b. In other words, in the second window sets w2, the torsional torque increases to the positive side with increase in torsion angle to the positive side in a positive-side torsional range as shown in FIG. 7.

On the other hand, when the damper device 1 is set to the second torsional condition as shown in FIG. 3D, in other words, when torsion of the hub flange 40 with respect to the input rotor 30 is caused from the neutral condition to the R1 side (corresponding to the negative side) by the angle θ1, the amount of offset between each axially opposed pair of second support portions 302 and each second accommodation portion 402 becomes "0".

Here, in each second window set w2, the interval between the R1 accommodation surface 402a in contact with the R1-side end surface of the coil spring 51 and the R2 support surfaces 302b in contact with the R2-side end surface of the coil spring 51 is G3 and becomes wider than the interval G0. The interval G3 is equal in magnitude to the free length of the coil spring 51. In other words, when the torsion angle between the input rotor 30 and the hub flange 40 reaches −θ1, the coil spring 51 in each second window set w2 becomes the free-length state, whereby the torsional torque becomes "0" as shown in FIG. 7.

Moreover, when torsion of the hub flange 40 with respect to the input rotor 30 is caused at a greater torsion angle than θ1 to the R1 side, the coil spring 51 in each second window set w2 is in contact at the R1-side end surface thereof with the R1 support surfaces 302a, while in contact at the R2-side end surface thereof with the R2 accommodation surface 402b. Furthermore, when the torsion angle further increases, the coil spring 51 is compressed from the free-length state, whereby the torsional torque gradually increases to the negative side as shown in FIG. 7.

<Net Torsional Characteristic>

In FIG. 7, the torsional characteristic w0 depicted with solid line is the net torsional characteristic obtained by adding the torsional characteristic w1 depicted with broken line and the torsional characteristic w2 depicted with dashed two-dotted line and represents torsional characteristics of the entire damper unit. In other words, the torsional torque is "0" in the neutral condition and increases to both the positive side and the negative side with increase in torsion angle to both the positive side and the negative side.

[Actions: with Hysteresis Torque]

Next, with use of schematic diagrams of FIG. 8 and thereafter, torsional characteristics will be explained in consideration of hysteresis torques. In the schematic diagrams, the first bushing 61 and the friction plate 64 are collectively explained as "friction member FP". In the following explanation, the angle θ1 described above will be set as "2°" but this setting is exemplary only. Besides, in the following explanation, the term "torsion angle" means an angle of torsion (relative rotation) of the input rotor 30 with respect to the hub flange 40. Furthermore, the torsion angle will be expressed in the form of absolute value.

<Neutral Condition>

Figure 8:
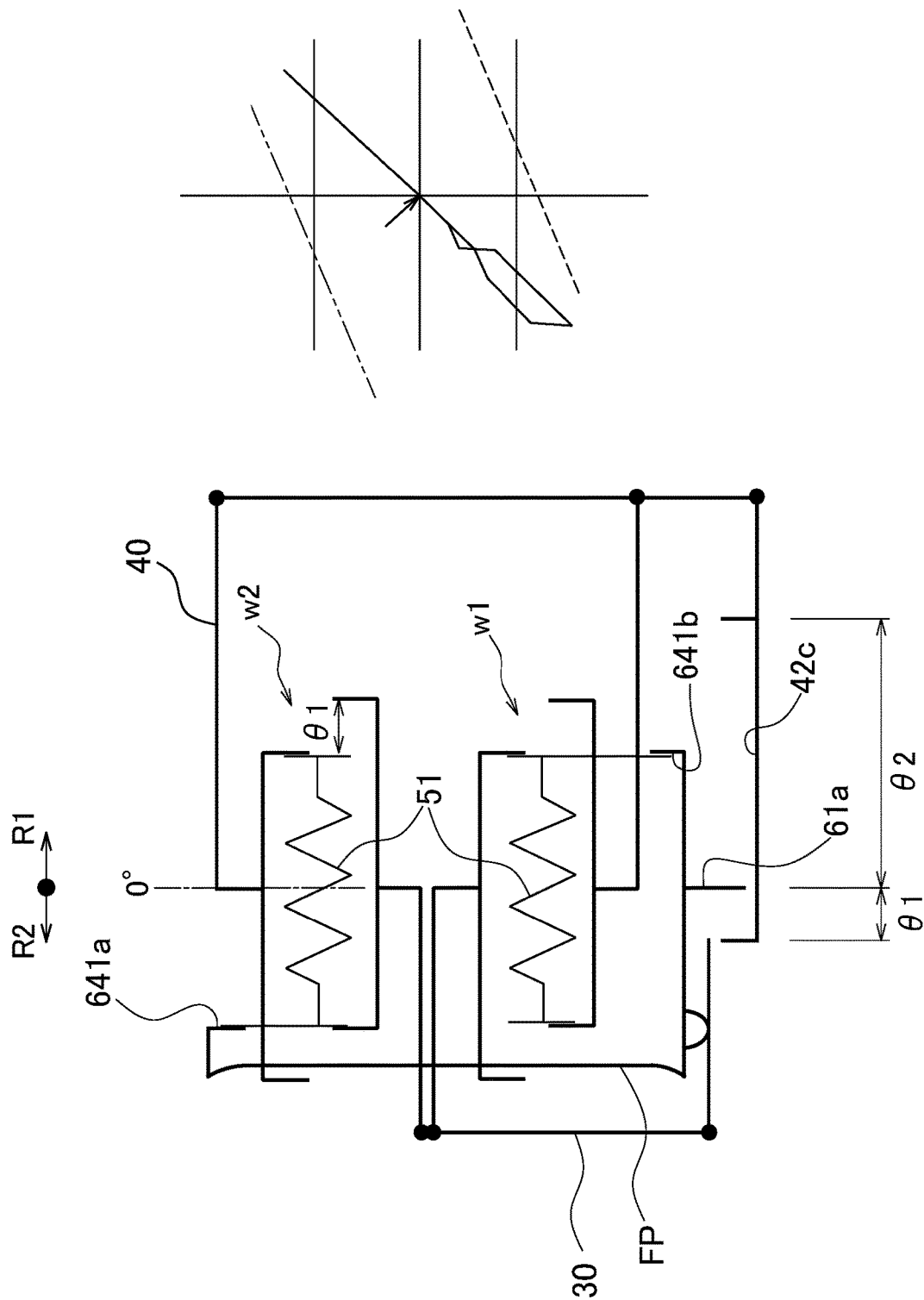
FIG. 8 is a diagram for explaining actions performed in a neutral condition.

FIG. 8 shows the neutral condition. In the neutral condition, the coil spring 51 in each window set w1, w2 is disposed in the compressed state. Besides, as described above, the contact surfaces 641a and 641b, which are the end surfaces of each protruding portion 641 of the friction plate 64, are in contact with the end surfaces of the corresponding pair of coil springs 51. Hence, the friction plate 64 is set in the neutral position. Consequently, gaps are reliably produced between each restriction protrusion 61a of the first bushing 61 and the end surfaces of each elongated hole 42c of the flange 42; one is produced on the R1 side of each restriction protrusion 61a and corresponds to θ2 (of e.g., 20°), whereas the other is produced on the R2 side of each restriction protrusion 61a and corresponds to θ1 (of e.g., 2°).

First, the torsional characteristics exerted when the damper device 1 is set to the first torsional condition (hereinafter referred to as "positive side torsional characteristics" on an as-needed basis) will be explained.

<Neutral Condition→Torsion Angle of 2°>

Figure 9:
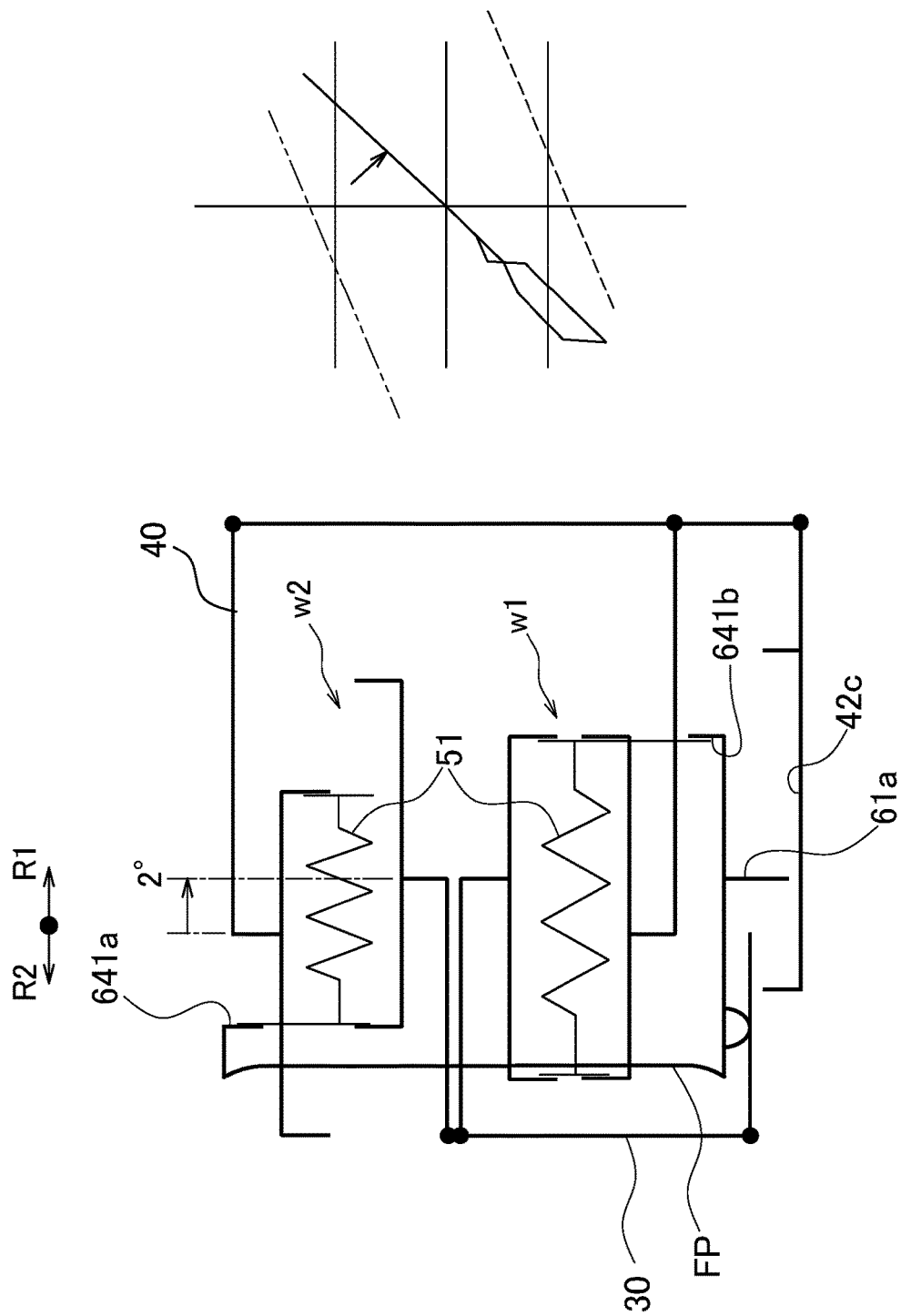
FIG. 9 is a diagram for explaining actions performed in a condition that the torsion is caused from the neutral condition to the R1 side by 2°.

FIG. 9 shows a condition that torsion of the input rotor 30 with respect to the hub flange 40 is caused from the neutral condition to the R1 side by 2°.

During transition from the condition shown in FIG. 8 to that shown in FIG. 9, in other words, during transition from the neutral condition to torsion caused by the torsion angle of 2°, the coil spring 51 in each first window set w1 extends from the compressed state and becomes the free-length state, whereas the coil spring 51 in each second window set w2 is further compressed from the compressed state. On the other hand, the friction member FP and the input rotor 30 are rotated to the R1 side in synchronization with each other; a hysteresis torque is not generated between the friction member FP and the input rotor 30. When described in detail, a hysteresis torque is not generated between the first bushing 61 of the friction member FP and the first plate 31. It should be noted that a hysteresis torque is not generated as well between the second bushing 62 and the friction plate 64.

<Torsion Angle of 2°→4°>

Figure 10:
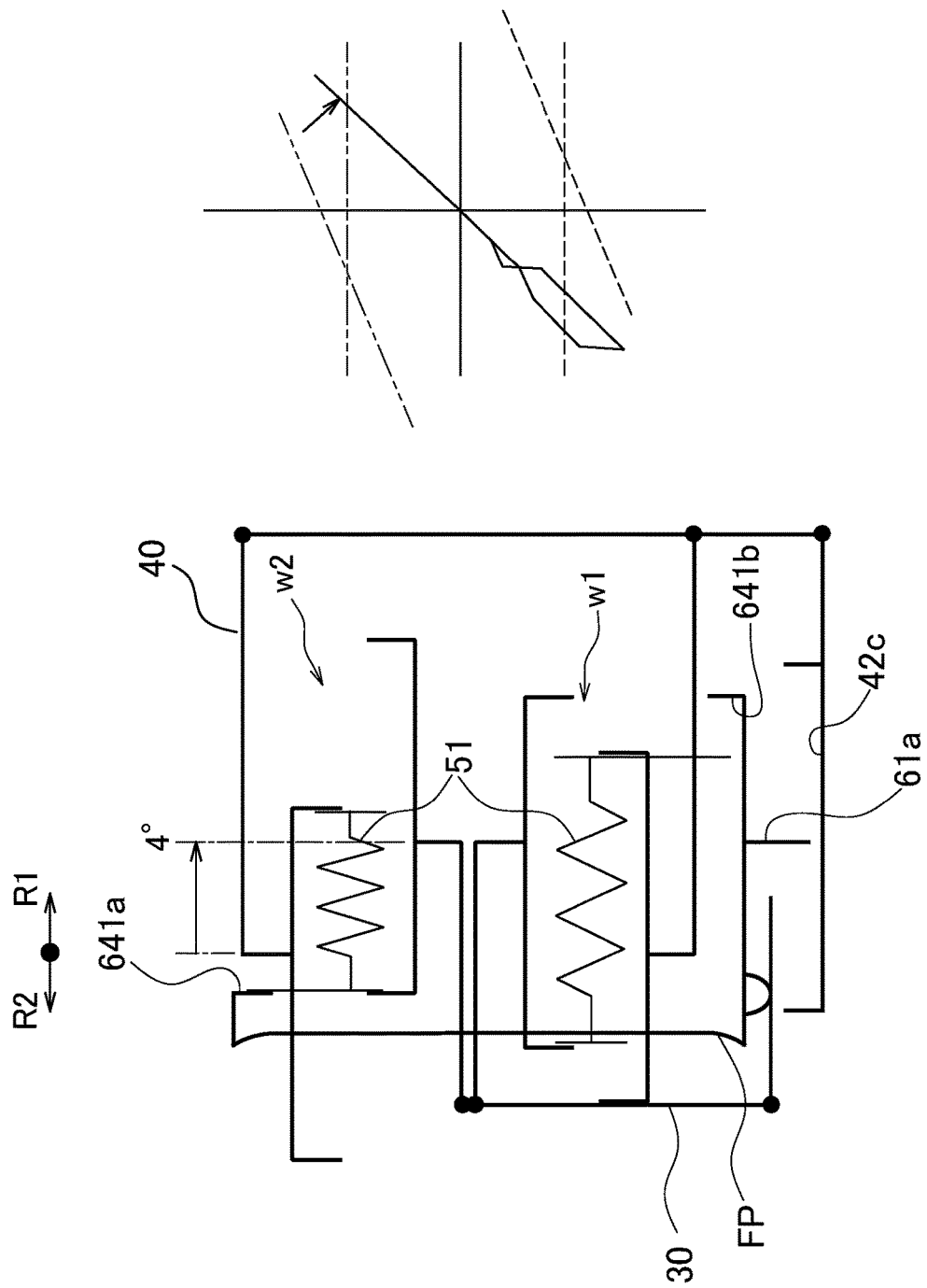
FIG. 10 is a diagram for explaining actions performed in a condition that the torsion is caused from the neutral condition to the R1 side by 4°.

FIG. 10 shows a condition that torsion of the input rotor 30 with respect to the hub flange is caused to the R1 side by 4°.

During transition from the condition shown in FIG. 9 to that shown in FIG. 10, in other words, during transition from the torsion angle of 2° to the torsion angle of 4°, the coil spring 51 in each first window set w1 is compressed from the free-length state and becomes the compressed state, whereas the coil spring 51 in each second window set w2 is further compressed from the compressed state. On the other hand, the friction member FP and the input rotor 30 are rotated to the R1 side in synchronization with each other; a hysteresis torque is not generated between the friction member FP and the input rotor 30.

<Torsion Angle of 4°→Neutral Condition>

During reverse transition from the torsion caused by the torsion angle of 4° to the neutral condition, the conditions transition from one to another in the reverse order to the above. In other words, the condition shown in FIG. 10 transitions to that shown in FIG. 9, and finally, the neutral condition shown in FIG. 8 is restored therefrom.

As described above, the hysteresis torque generating mechanism 60 is configured not to generate a hysteresis torque, while the damper device 1 is in the first torsional condition.

Next, torsional characteristics exerted when the damper device 1 is set to the second torsional condition (hereinafter referred to as "negative side torsional characteristics" on an as-needed basis) will be explained.

<Neutral Condition→Torsion Angle of 2°>

Figure 11:
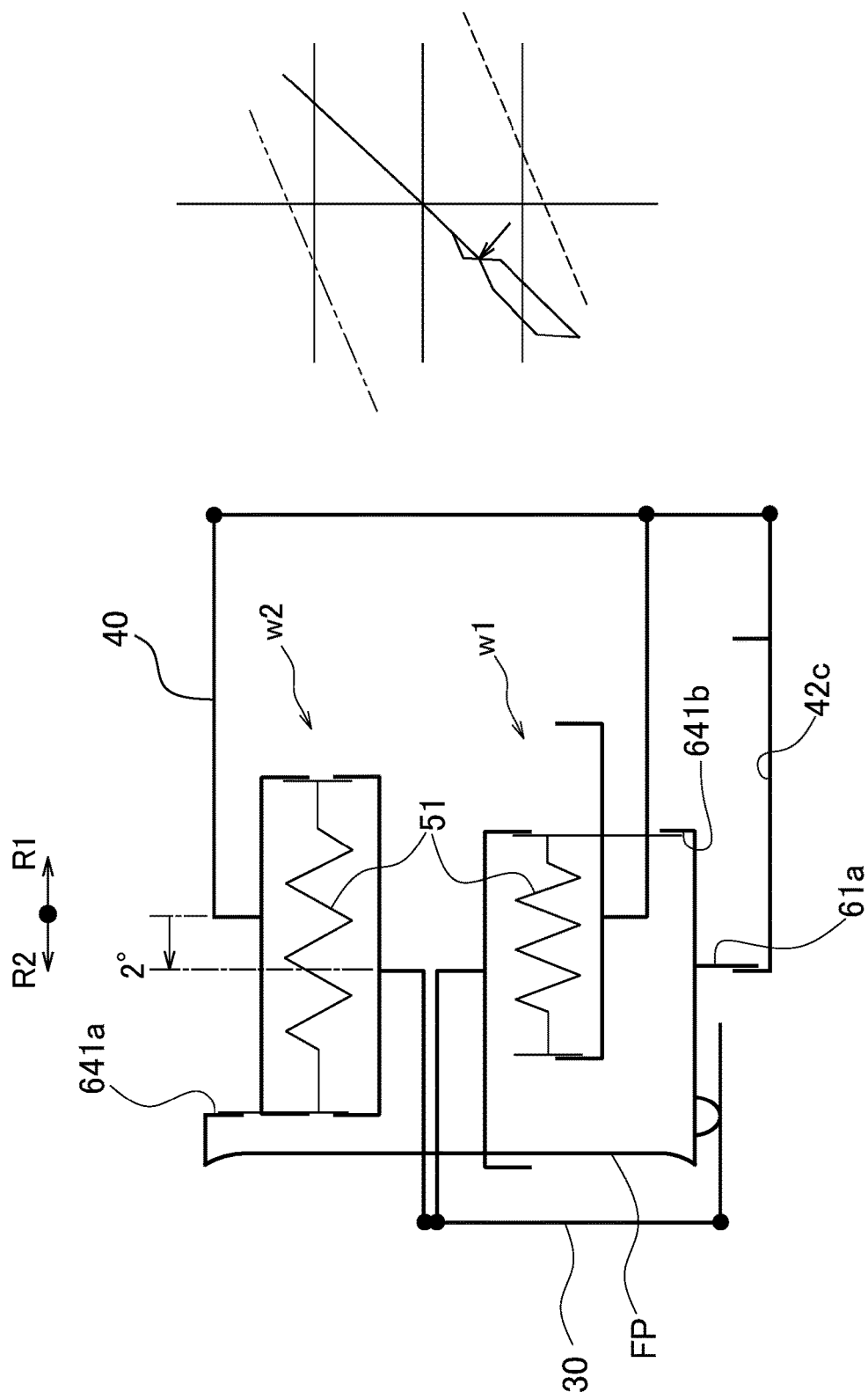
FIG. 11 is a diagram for explaining actions performed in a condition that the torsion is caused from the neutral condition to the R2 side by 2°.

FIG. 11 shows a condition that torsion of the input rotor 30 with respect to the hub flange is caused to the R2 side by 2° in the course of increase in torsion angle. In this condition, each restriction protrusion 61a of the first bushing 61 is in contact with the R2-side end surface of each elongated hole 42c of the flange 42.

During transition from the condition shown in FIG. 8 to that shown in FIG. 11, in other words, during transition from the neutral condition to torsion caused to the R2 side by 2°, the coil spring 51 in each second window set w2 extends from the compressed state and becomes the free-length state, whereas the coil spring 51 in each first window set w1 is further compressed from the compressed state. On the other hand, the friction member FP is rotated to the R2 side in synchronization with the input rotor 30. Because of this, a hysteresis torque is not generated between the friction member FP and the input rotor 30. When described in detail, a hysteresis torque is not generated between the first bushing 61 of the friction member FP and the first plate 31; likewise, a hysteresis torque is not generated between the second bushing 62 of the friction member FP and the friction plate 64.

<Torsion Angle of 2°→4°>

Figure 12:
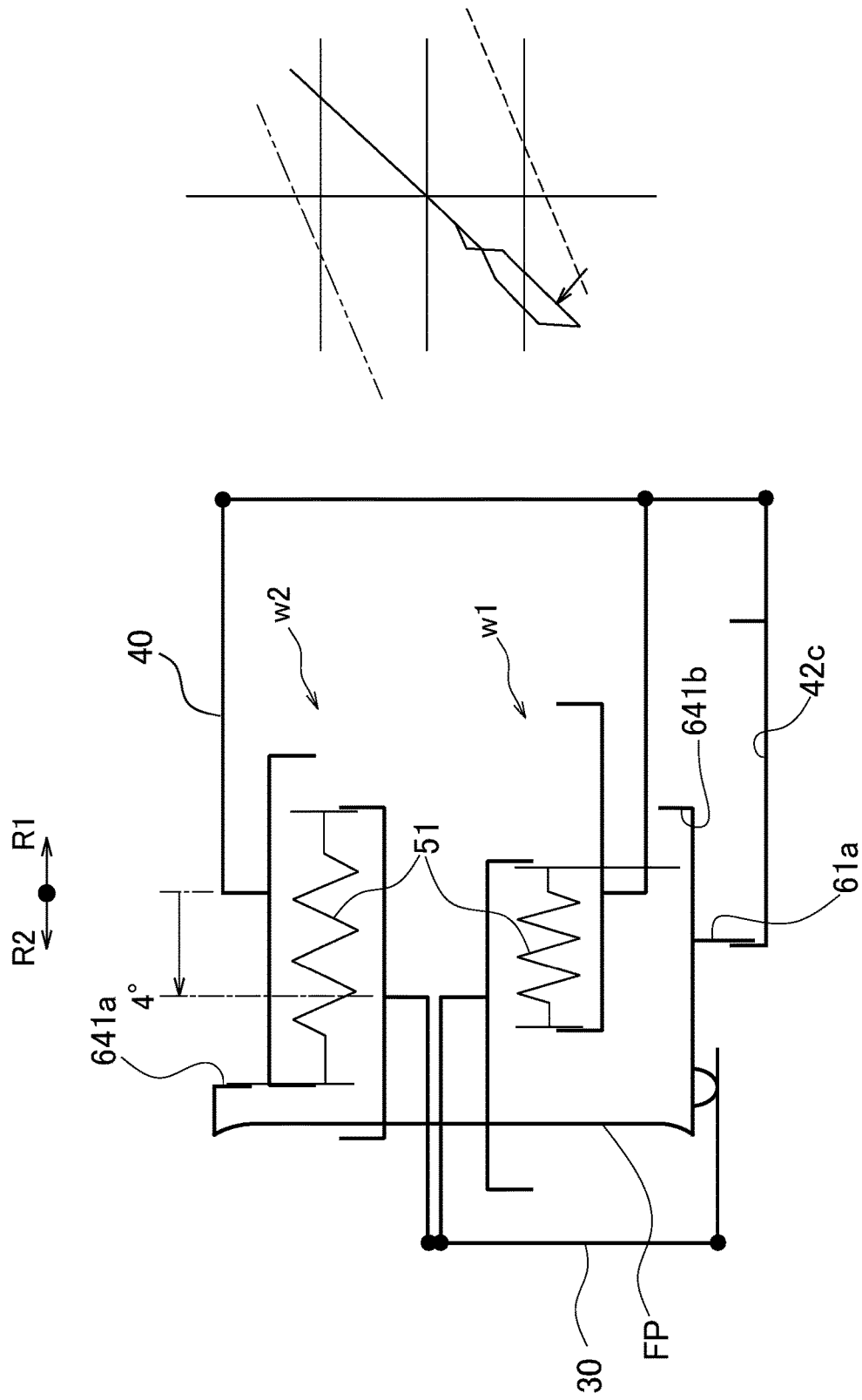
FIG. 12 is a diagram for explaining actions performed in a condition that the torsion is caused from the neutral condition to the R2 side by 4°.

FIG. 12 shows a condition that torsion of the input rotor 30 with respect to the hub flange is caused to the R2 side by 4° in the course of increase in torsion angle.

During transition from the condition shown in FIG. 11 to that shown in FIG. 12, in other words, during transition from the torsion angle of 2° to the torsion angle of 4°, the coil spring 51 in each first window set w1 is further compressed from the compressed state, whereas the coil spring 51 in each second window set w2 is compressed from the free-length state and becomes the compressed state.

Besides, the input rotor 30 is rotated to the R2 side. On the other hand, each restriction protrusion 61a contacts with one end surface of each elongated hole 42c of the flange 42, whereby the friction member FP is prevented from rotating to the R2 side. As a result, the friction member FP is rotated relative to the input rotor 30, whereby hysteresis torques are generated therebetween. When described in detail, the first bushing 61 is rotated relative to the first plate 31, whereby a hysteresis torque is generated therebetween. On the other hand, the second bushing 62 is rotated relative to the friction plate 64, whereby a hysteresis torque is generated therebetween.

<Torsion Angle of 4°→3°>

Figure 13:
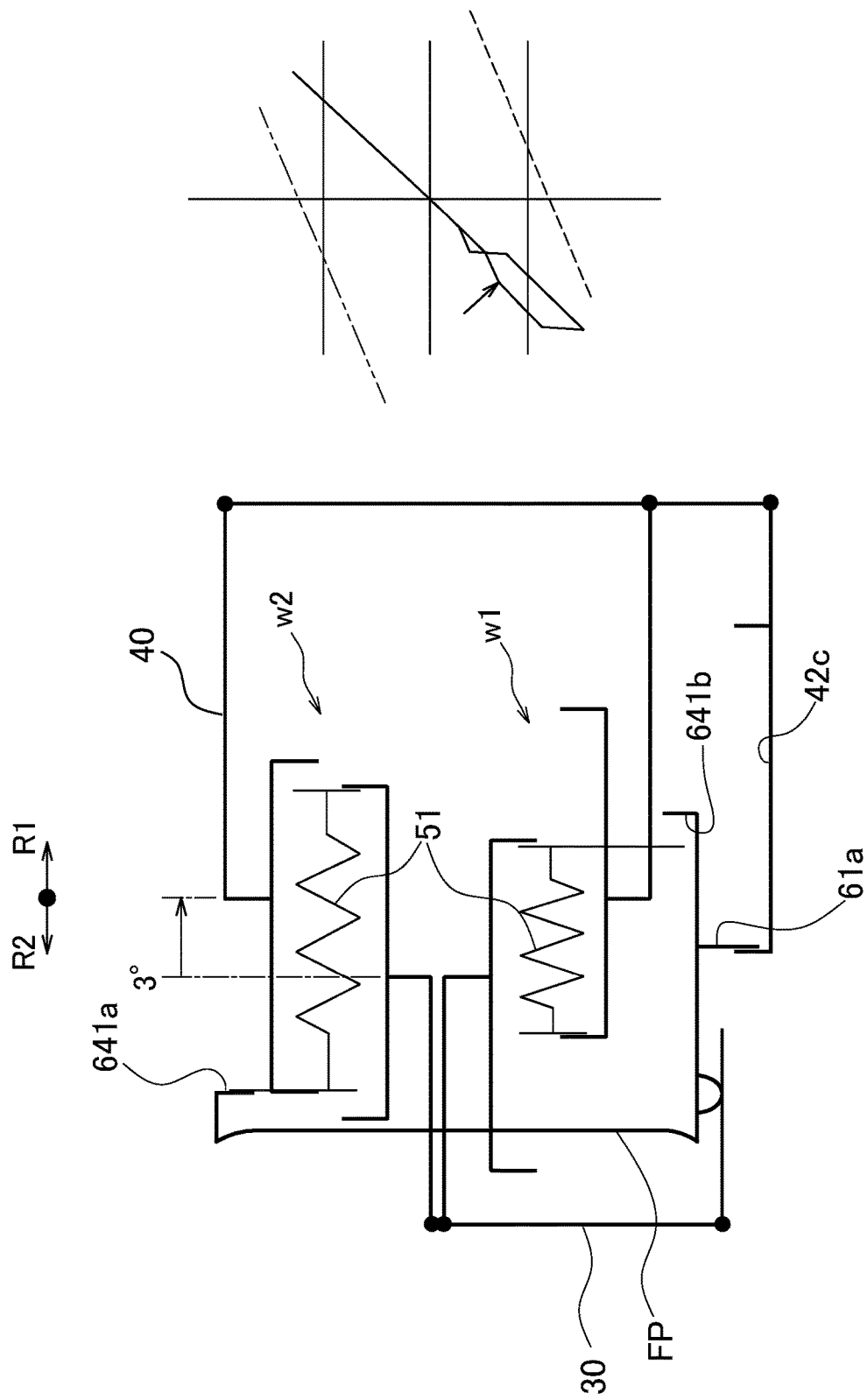
FIG. 13 is a diagram for explaining actions performed in a condition that the torsion is caused from the neutral condition to the R2 side by 3°.

FIG. 13 shows a condition that torsion of the input rotor 30 with respect to the hub flange is caused to the R2 side by 3° in the course of restoration to the neutral condition. During transition from the condition shown in FIG. 12 to that shown in FIG. 13, in other words, during reverse transition from the torsion angle of 4° to the torsion angle of 3°, the input rotor 30 is rotated to the R1 side, whereas the friction member FP is not rotated. When described in detail, in the friction member FP, each contact surface 641a is in contact with the end surface of the coil spring 51 in each second window set w2, whereas each contact surface 641b is not in contact with the end surface of the coil spring 51 in each first window set w1. In other words, the friction member FP is urged only to the R2 side by the coil springs 51 in the second window sets w2. Because of this, the friction member FP is not rotated to the R1 side. Therefore, the input rotor 30 is rotated relative to the friction member FP, whereby a hysteresis torque is generated in a torsion angular range of 4° to 3°.

<Torsion Angle of 3°→2°>

Figure 14:
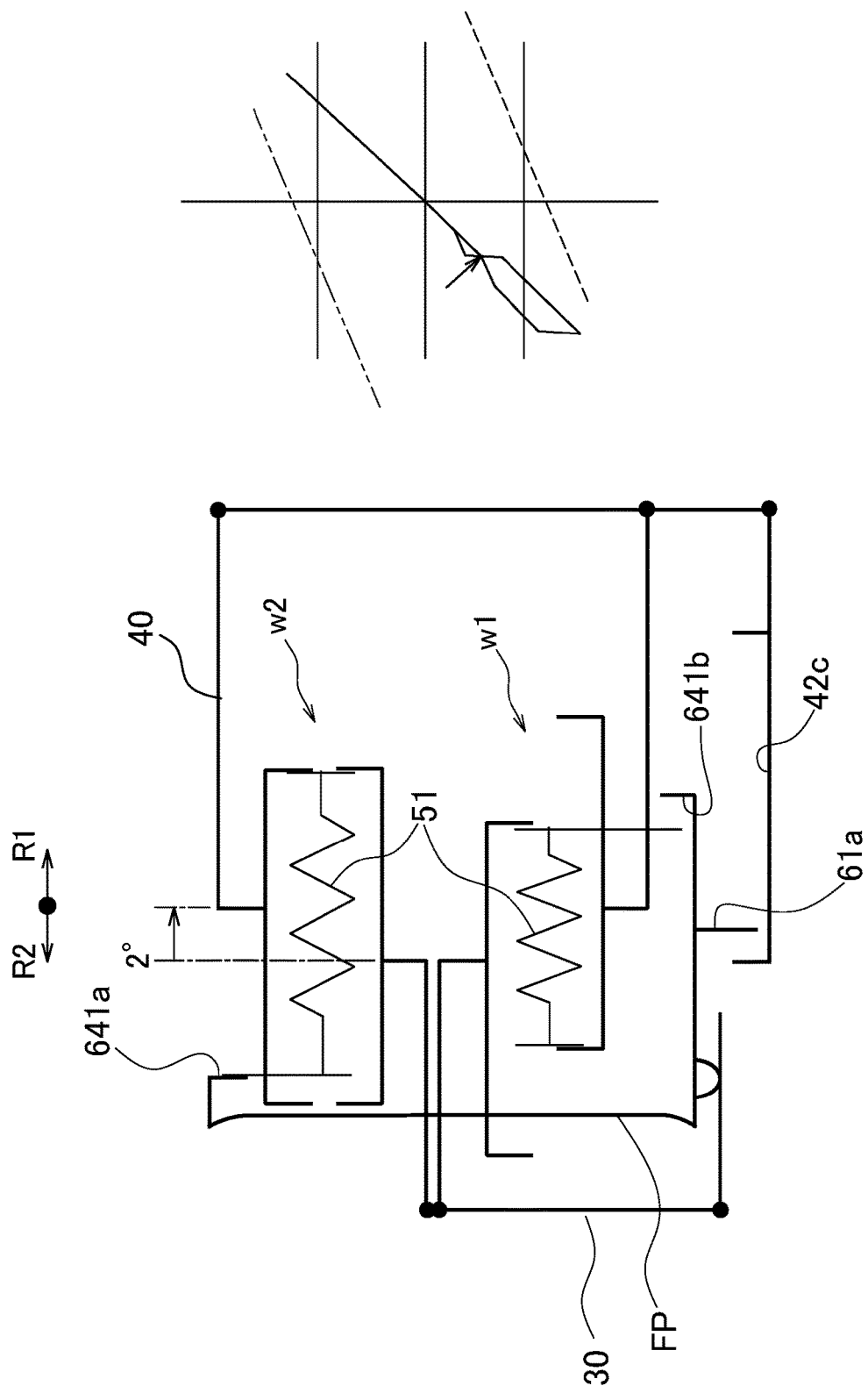
FIG. 14 is a diagram for explaining actions performed in a condition that the torsion is caused from the neutral condition to the R2 side by 2°.

FIG. 14 shows a condition that torsion of the input rotor 30 with respect to the hub flange is caused to the R2 side by 2° in the course of restoration to the neutral condition. During transition from the condition shown in FIG. 13 to that shown in FIG. 14, in other words, during reverse transition from the torsion angle of 3° to the torsion angle of 2°, the input rotor 30 and the friction member FP are rotated in synchronization with each other. In other words, the input rotor 30 and the friction member FP are not rotated relative to each other.

When described in detail, in the course of restoration to the neutral condition, the torsion angle reaches 3° (exemplary only) and torques generated by the coil springs 51 in the second window sets w2 are made small; accordingly, the torques generated by the coil springs 51 in the second window sets w2 and the hysteresis torque generated between the input rotor 30 and the friction member FP are balanced. Because of this, the coil spring 51 in each second window set w2 is prevented from further extending from the state thereof made at this moment by the hysteresis torque. In other words, until the torsion angle reaches 2° from 3°, the coil spring 51 in each second window set w2 is not actuated. Because of this, only the coil spring 51 in each first window set w1 contributes to the torsional stiffness of the entirety of the damper device 1 (specifically, with one-half of the stiffness in the net characteristic).

Besides, during reverse transition from the torsion angle 3° to the torsion angle of 2°, the friction member FP and the input rotor 30 are rotated to the R1 side in synchronization with each other; hence, a hysteresis torque is not generated therebetween.

<Torsion Angle of 2°→1°>

Figure 15:
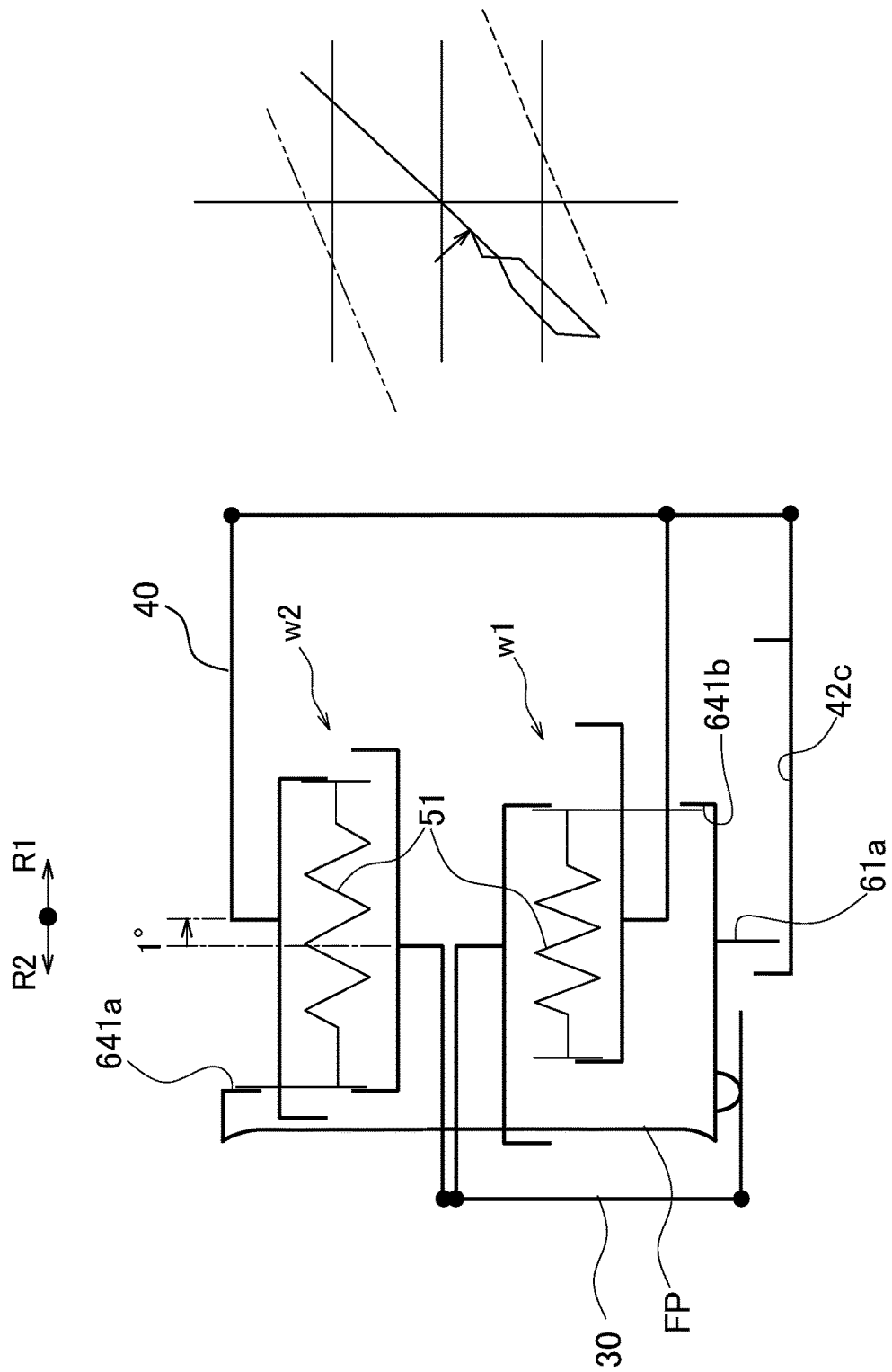
FIG. 15 is a diagram for explaining actions performed in a condition that the torsion is caused from the neutral condition to the R2 side by 1°.

FIG. 15 shows a condition that torsion of the input rotor 30 with respect to the hub flange is caused to the R2 side by 1° in the course of restoration to the neutral condition. During transition from the condition shown in FIG. 14 to that shown in FIG. 15, in other words, during reverse transition from the torsion angle of 2° to the torsion angle of 1°, the input rotor 30 is rotated relative to the friction member FP.

Speaking in detail, when the torsion angle reaches 2°, the coil spring 51 in each second window set w2 is in contact at the R1-side end surface thereof with the corresponding end surface of the hub flange 40. Because of this, until the torsion angle reaches 1° from 2°, the friction member FP receives repulsion from the coil spring 51 in each second window set w2 and is disabled to be rotated in conjunction with the input rotor 30. Consequently, the input rotor 30 is rotated relative to the friction member FP, whereby a hysteresis torque is generated in accordance with a force (torque) by which the coil spring 51 in each second window set w2 is compressed.

Besides, until the torsion angle reaches 10 from 2°, the coil spring 51 in each second window set w2 is not actuated. Because of this, only the coil spring 51 in each first window set w1 contributes to the torsional stiffness of the entirety of the damper device 1 (specifically, with one-half of the stiffness in the net characteristic).

<Torsion Angle of 1°→Neutral Condition>

As shown in FIG. 15, when the torsion angle reaches 10, the coil spring 51 in each second window set w2 contacts at the R2-side end surface thereof with the corresponding end surfaces of the input rotor 30. Because of this, during transition from the condition shown in FIG. 15 to that shown in FIG. 8, in other words, during reverse transition from torsion caused by the torsion angle of 1° to the neutral condition, the input rotor 30 is rotated in synchronization with the friction member FP; hence, a hysteresis torque is not generated therebetween.

Besides, during reverse transition from torsion caused by the torsion angle of 1° to the neutral condition, the coil spring 51 in each first window set w1 and that in each second window set w2 are actuated, whereby a net stiffness is obtained, as the torsional stiffness of the entire device, by adding the stiffness of the coil springs 51 in the first window sets w1 and that of the coil springs 51 in the second window sets w2. Besides, at this moment, the friction member FP is set in the neutral position.

As described above, while the damper device 1 is in the second torsional condition, the hysteresis torque generating mechanism 60 is configured not to generate a hysteresis torque in a first range of torsion angle (of 0° to 1°) set to be less than a first angle. Specifically, the hysteresis torque generating mechanism 60 does not generate a hysteresis torque both in the course of transition from the torsion angle of 0° to the torsion angle of 1° and in the course of reverse transition from the torsion angle of 1° to the torsion angle of 0°.

Besides, the hysteresis torque generating mechanism 60 generates a first hysteresis torque in a second range of torsion angle (of 1° to 2°) set to be greater than or equal to the first angle and be less than a second angle. Specifically, the hysteresis torque generating mechanism 60 does not generate a hysteresis torque in the course of transition from the torsion angle of 1° to the torsion angle of 2° but generates a hysteresis torque in the course of reverse transition from the torsion angle of 2° to the torsion angle of 1°.

Moreover, the hysteresis torque generating mechanism 60 generates a second hysteresis torque in a third range of torsion angle (of 2° to 3°) set to be greater than or equal to the second angle and be less than a third angle. Specifically, the hysteresis torque generating mechanism 60 generates a hysteresis torque in the course of transition from the torsion angle of 2° to the torsion angle of 3° but does not generate a hysteresis torque in the course of reverse transition from the torsion angle of 3° to the torsion angle of 2°. It should be noted that the second hysteresis torque is greater in magnitude than the first hysteresis torque.

Furthermore, the hysteresis torque generating mechanism 60 generates a third hysteresis torque in a fourth range of torsion angle (of 3° to MAX) set to be greater than or equal to the third angle and be less than or equal to the maximum angle. Specifically, the hysteresis torque generating mechanism 60 generates a hysteresis torque both in the course of transition from the torsion angle of 3° to the torsion angle of MAX and in the course of reverse transition from the torsion angle of MAX to the torsion angle of 3°. It should be noted that the third hysteresis torque is greater in magnitude than the second hysteresis torque.

Other Preferred Embodiments

The present invention is not limited to the preferred embodiment described above, and a variety of changes or modifications can be made without departing from the scope of the present invention.

(a) In the preferred embodiment described above, the torsion angle $\theta 1$, corresponding to the gap between each restriction protrusion 61a and the circumferentially R2-side end surface of each elongated hole 42c, is equal in magnitude to the R2-side offset amount $\theta 1$ between each axially opposed pair of first support portions 301 and each first accommodation portion 401. However, the configuration of the damper device 1 is not limited to this. For example, the torsion angle, corresponding to the gap between each restriction protrusion 61a and the circumferentially R2-side end surface of each elongated hole 42c, can be set to be greater in magnitude than the offset amount $\theta 1$.

For example, the torsion angle, corresponding to the gap between each restriction protrusion 61a and the circumferentially R2-side end surface of each elongated hole 42c, can be set to be $2\theta 1$.

The torsional characteristics to be exerted in this setting will be hereinafter explained with schematic diagrams. It should be noted that the torsional characteristics, exerted when the damper device 1 is in the first torsional condition, are similar to those in the preferred embodiment described above; hence, the torsional characteristics, exerted when the damper device 1 is in the second torsional condition, will be explained.

Figure 16:
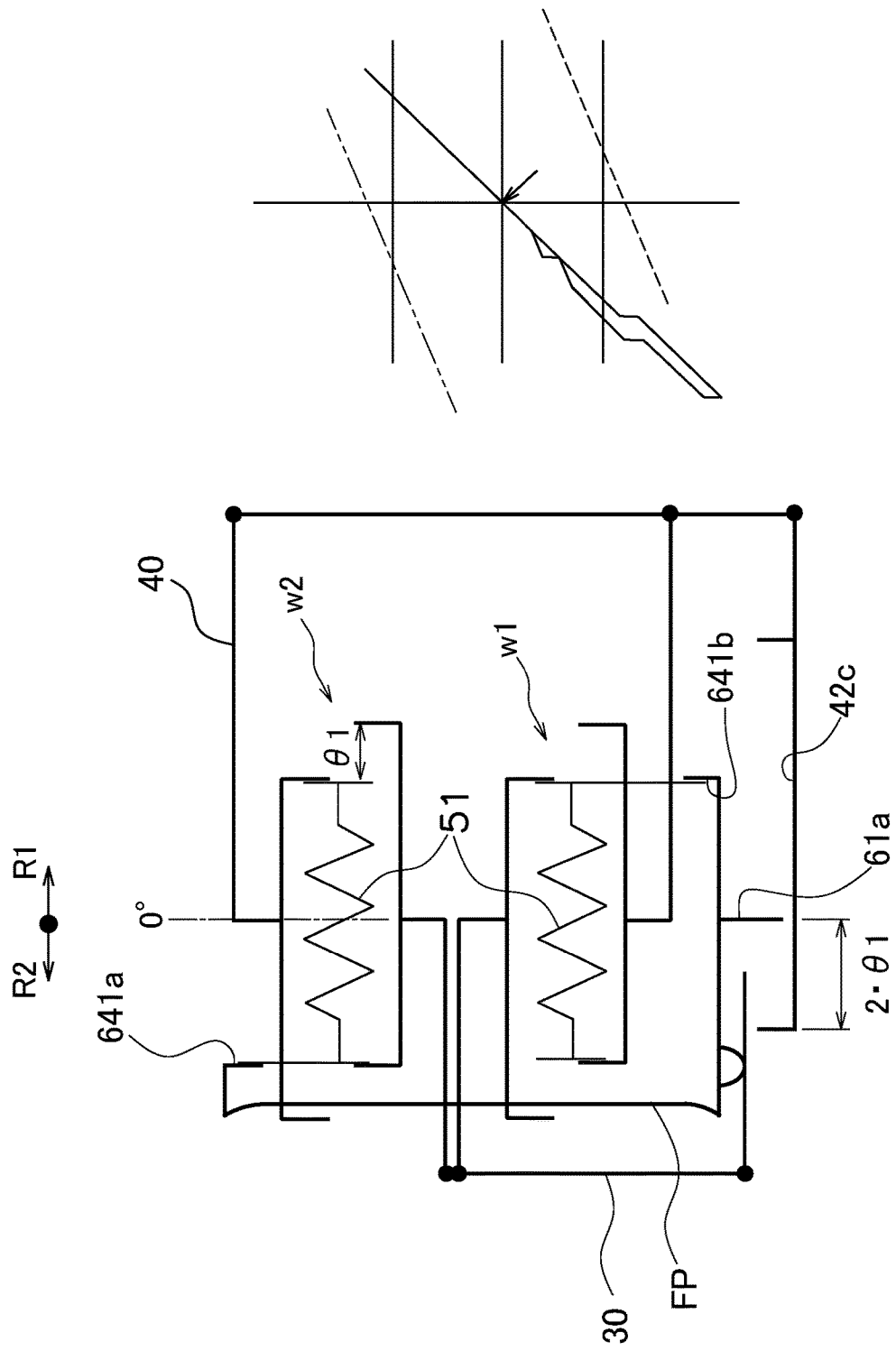
FIG. 16 is a diagram for explaining actions performed in the neutral condition.

FIG. 16 shows the neutral condition. The neutral condition in this setting is identical to that in the preferred embodiment described above except for the gap between each restriction protrusion 61a and the R2-side end surface of each elongated hole 42c. It should be noted that the torsion angle $2\theta 1$, corresponding to the gap between each restriction protrusion 61a and the R2-side end surface of each elongated hole 42c, is set to be, for instance, 4°.

<Neutral Condition→Torsion Angle of 2°>

Figure 17:
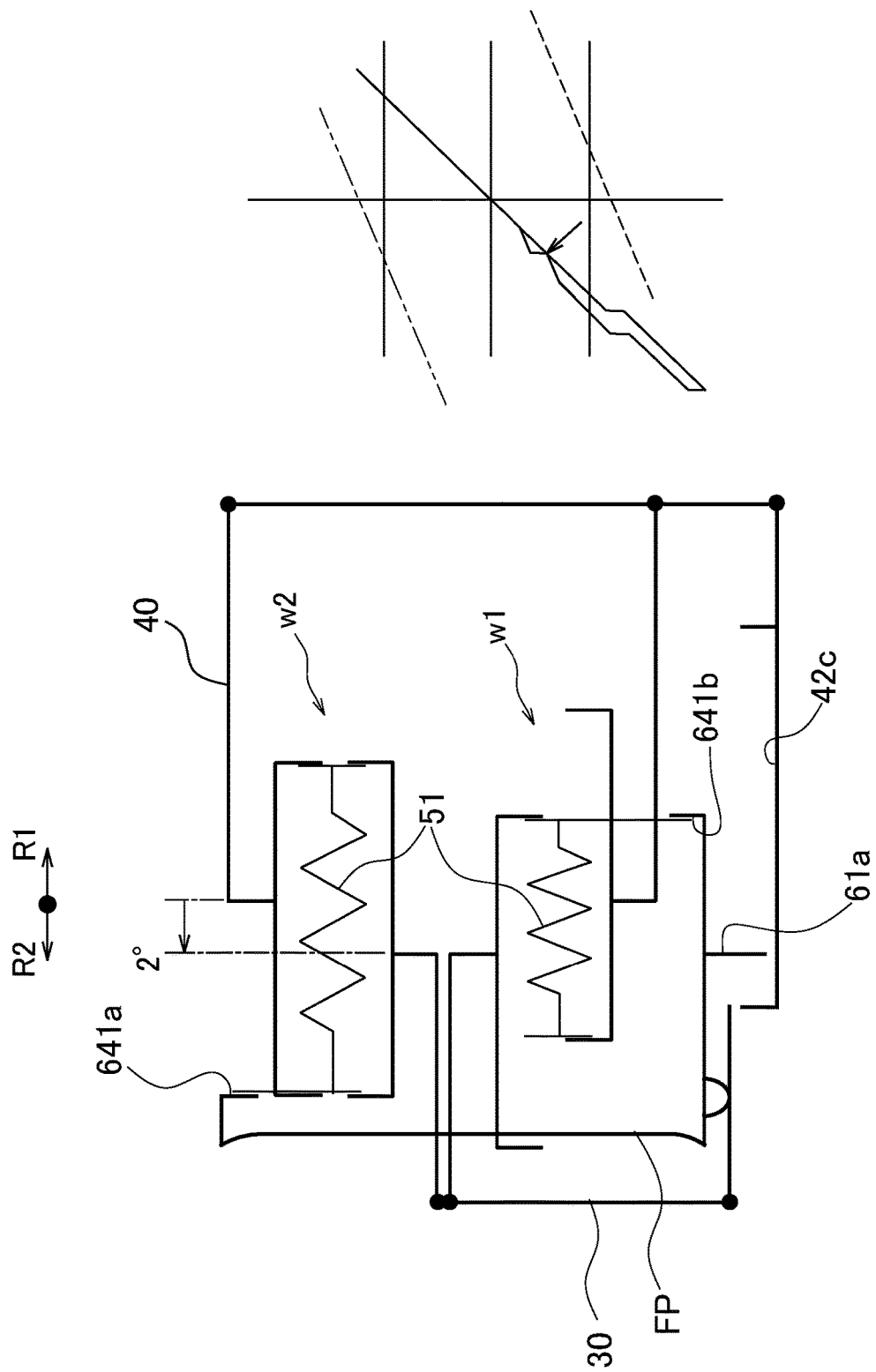
FIG. 17 is a diagram for explaining actions performed in a condition that the torsion is caused from the neutral condition to the R2 side by 2°.

FIG. 17 shows a condition that torsion of the input rotor 30 with respect to the hub flange is caused to the R2 side by 2° in the course of increase in torsion angle.

During transition from the condition shown in FIG. 16 to that shown in FIG. 17, in other words, during transition from the neutral condition to torsion caused to the R2 side by 2°, the coil spring 51 in each first window set w1 is further compressed from the compressed state. On the other hand, the coil spring 51 in each second window set w2 extends from the compressed state and becomes the free-length state.

Besides, the friction member FP is rotated in synchronization with the input rotor 30. Because of this, a hysteresis torque is not generated between the friction member FP and the input rotor 30. When described in detail, a hysteresis torque is not generated between the first bushing 61 of the friction member FP and the first plate 31; likewise, a hysteresis torque is not generated between the second bushing 62 of the friction member FP and the friction plate 64.

<Torsion Angle of 2°→4°>

Figure 18:
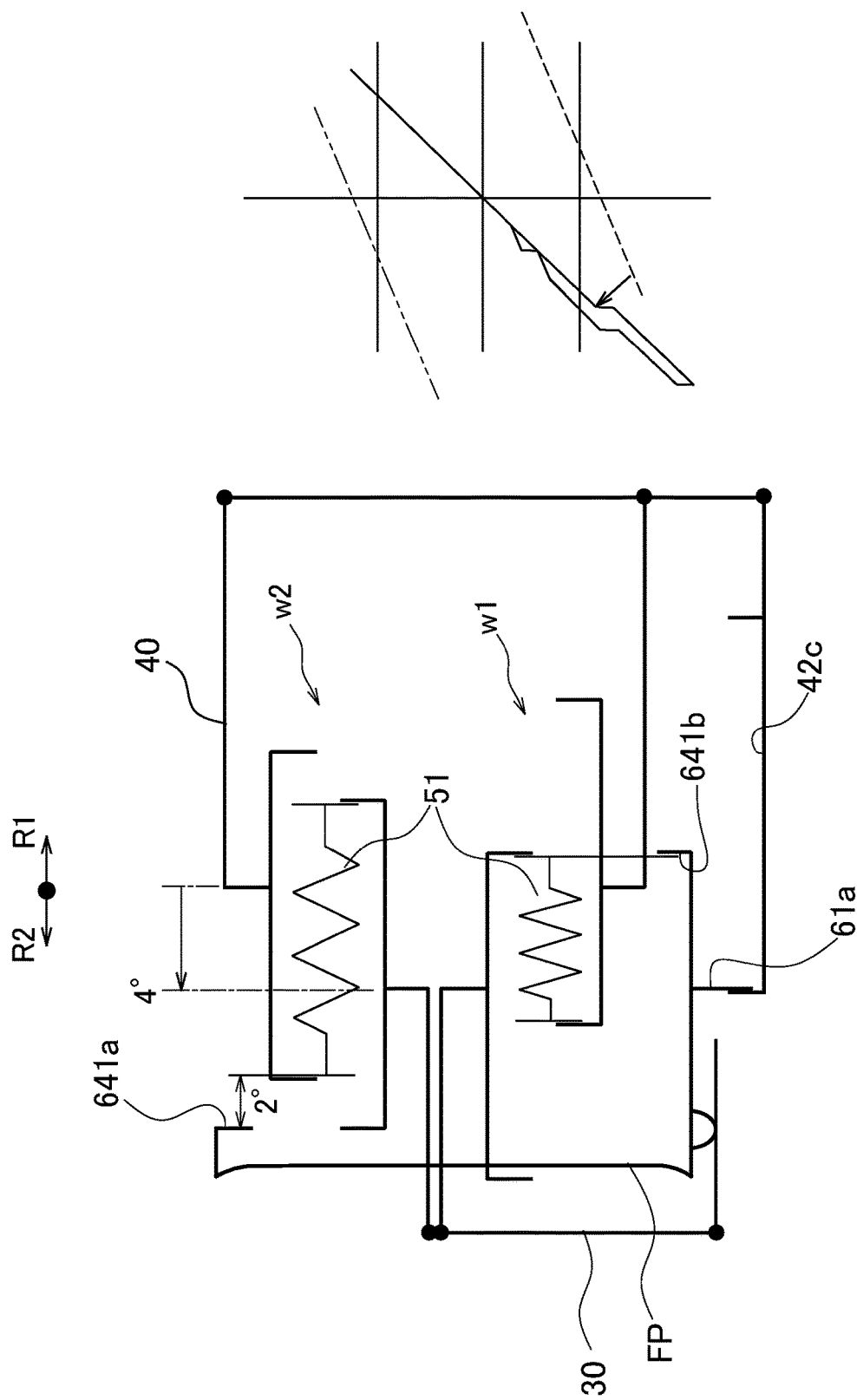
FIG. 18 is a diagram for explaining actions performed in a condition that the torsion is caused from the neutral condition to the R2 side by 4°.

FIG. 18 shows a condition that torsion of the input rotor 30 with respect to the hub flange is caused to the R2 side by 4° in the course of increase in torsion angle.

During transition from the condition shown in FIG. 17 to that shown in FIG. 18, in other words, during transition from the torsion angle of 2° to the torsion angle of 4°, the coil spring 51 in each first window set w1 is further compressed from the compressed state. On the other hand, the coil spring 51 in each second window set w2 is compressed from the free-length state and becomes the compressed state.

The friction member FP is still kept rotated in synchronization with the input rotor 30; hence, a hysteresis torque is not generated between the friction member FP and the input rotor 30.

Each contact surface 641a of the friction member FP is gradually separated away from the corresponding end surface of the coil spring 51 in each second window set w2; then, when the torsion angle reaches 4°, the angle, corresponding to the gap between each contact surface 641a and the corresponding end surface of the coil spring 51 in each second window set w2, becomes 2°.

<Torsion Angle of 4°→7°>

Figure 19:
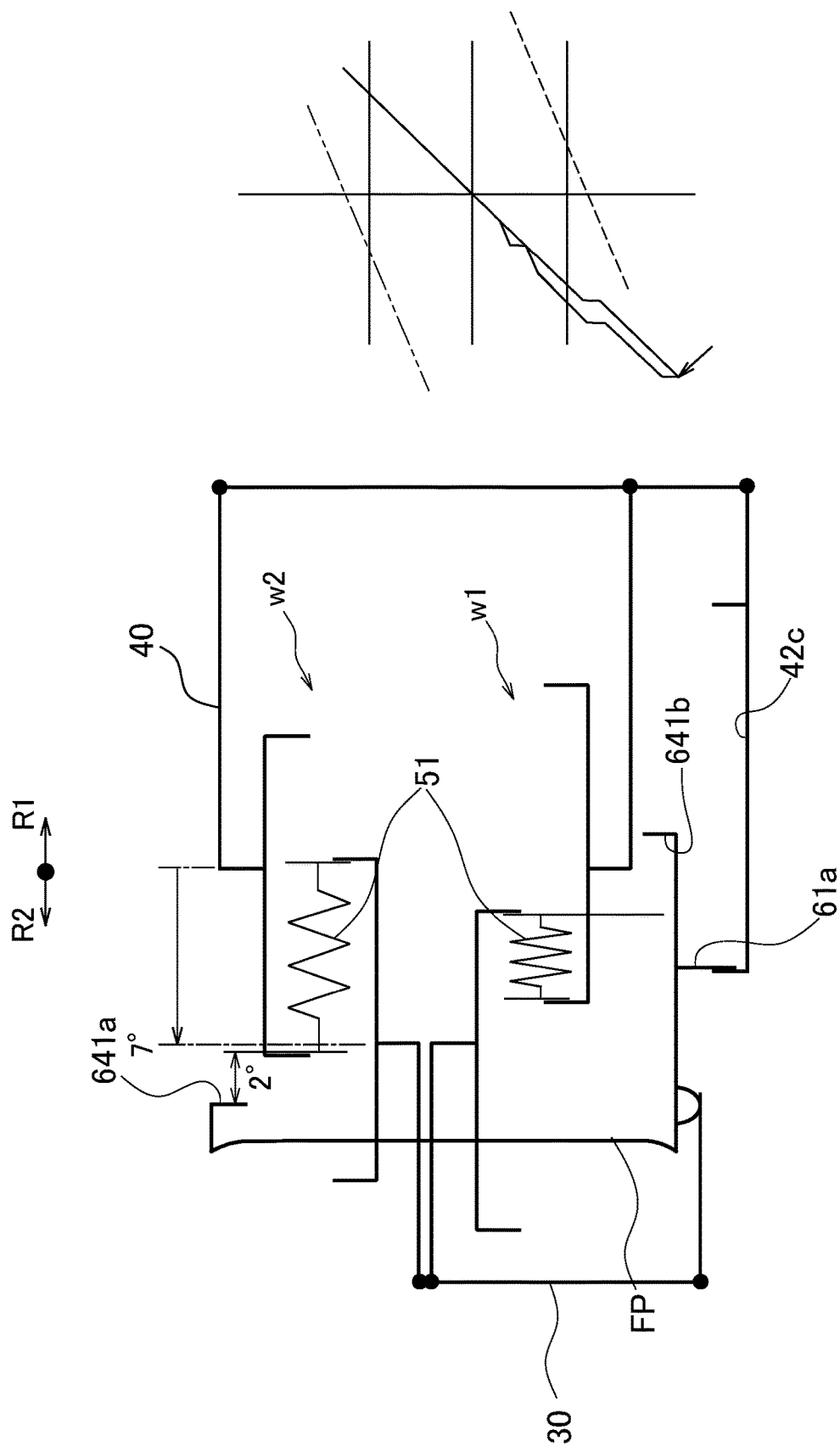
FIG. 19 is a diagram for explaining actions performed in a condition that the torsion is caused from the neutral condition to the R2 side by 7°.

FIG. 19 shows a condition that torsion of the input rotor 30 with respect to the hub flange is caused to the R2 side by 7° in the course of increase in torsion angle.

During transition from the condition shown in FIG. 18 to that shown in FIG. 19, in other words, during transition from the torsion angle of 4° to the torsion angle of 7°, the coil spring 51 in each first window set w1 and that in each second window set w2 are further compressed from the compressed state.

Besides, the input rotor 30 is rotated to the R2 side. On the other hand, each restriction protrusion 61a contacts with one end surface of each elongated hole 42c of the flange 42, whereby the friction member FP is prevented from rotating to the R2 side. As a result, the friction member FP is rotated relative to the input rotor 30, whereby hysteresis torques are generated therebetween. When described in detail, the first bushing 61 is rotated relative to the first plate 31, whereby a hysteresis torque is generated therebetween. On the other hand, the second bushing 62 is rotated relative to the friction plate 64, whereby a hysteresis torque is generated therebetween.

Besides, when the torsion angle is greater than or equal to 4°, the torsion angle, corresponding to the gap between each contact surface 641a and the corresponding end surface of the coil spring 51 in each second window set w2, is constantly maintained at 2°. The angle of this gap (i.e., 2°) is obtained by subtracting the torsion angle corresponding to the amount of offset (i.e., 2°) from the angle corresponding to the gap produced on the R2 side of each restriction protrusion 61a in each hole 42c (i.e., 4°). Therefore, the friction member FP can be actuated together with the input rotor 30 in the angular range of 2° described above (relative torsion angle) included in a high torsion angular range that the torsion angle is greater than or equal to 4°. In other words, a hysteresis torque is not generated when the relative torsion angle falls in the angular range of 2° (exemplary minute torsion angular range).

Therefore, a relatively large hysteresis torque can be obtained in the high torsion angular range that the torsion angle (absolute angle) is greater than or equal to 4°. Besides, even when the absolute torsion angle is greater than or equal to 4°, a hysteresis torque is not generated if the relative torsion angle between the input rotor 30 and the hub flange 40 falls in the minute torsion angular range of 2°. Therefore, minute torque fluctuations can be effectively attenuated in a traveling range corresponding to the high torsion angular range in the torsional characteristics.

<Torsion Angle of 7°→5°>

Figure 20:
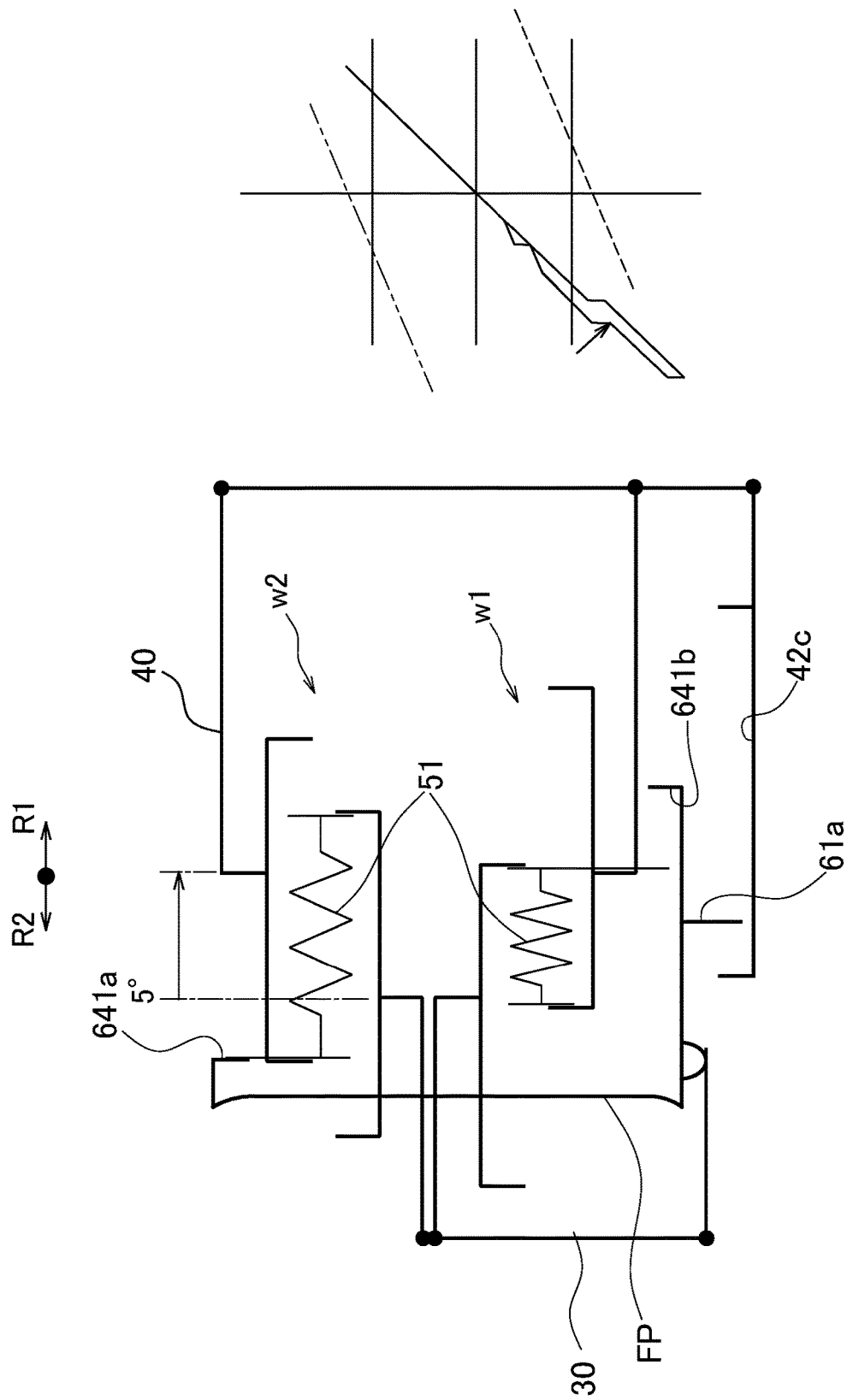
FIG. 20 is a diagram for explaining actions performed in a condition that the torsion is caused from the neutral condition to the R2 side by 5°.

FIG. 20 shows a condition that torsion of the input rotor 30 with respect to the hub flange is caused to the R2 side by 5° in the course of restoration to the neutral condition. During transition from the condition shown in FIG. 19 to that shown in FIG. 20, in other words, during reverse transition from the torsion angle of 7° to the torsion angle of 5°, the input rotor 30 is rotated to the R1 side in synchronization with the friction member FP Therefore, a hysteresis torque is not generated until the torsion angle reaches 5° from 7°.

<Torsion Angle of 5°→3°>

Figure 21:
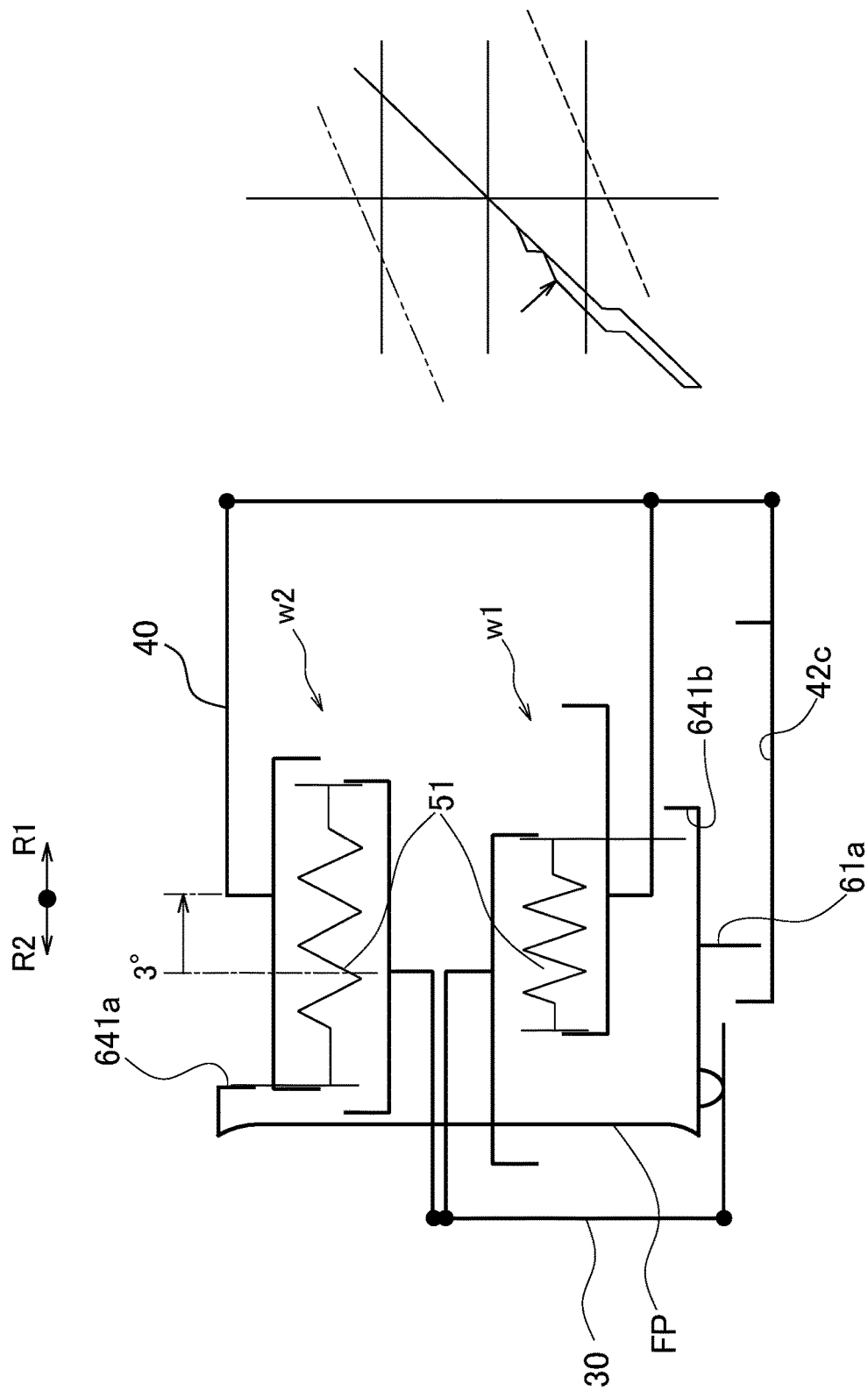
FIG. 21 is a diagram for explaining actions performed in a condition that the torsion is caused from the neutral condition to the R2 side by 3°.

FIG. 21 shows a condition that torsion of the input rotor 30 with respect to the hub flange is caused to the R2 side by 3° in the course of restoration to the neutral condition. During transition from the condition shown in FIG. 20 to that shown in FIG. 21, in other words, during reverse transition from the torsion angle of 5° to the torsion angle of 3°, the input rotor 30 is rotated to the R1 side, whereas the friction member FP is not rotated. When described in detail, in the friction member FP, each contact surface 641a is in contact with the corresponding end surface of the coil spring 51 in each second window set w2, whereas each contact surface 641b is not in contact with the corresponding end surface of the coil spring 51 in each first window set w1. In other words, the friction member FP is urged only to the R2 side by the coil springs 51 in the second window sets w2. Because of this, the friction member FP is not rotated to the R1 side. Therefore, the input rotor 30 is rotated relative to the friction member FP, whereby a hysteresis torque is generated until the torsion angle reaches 3° from 50.

<Torsion Angle of 3°→Neutral Condition>

The torsional characteristics, exerted during reverse transition from the torsion caused by the torsion angle of 3° to the neutral condition, are identical to those in the preferred embodiment described above; hence, the detailed explanation thereof will be hereinafter omitted.

As described above, the hysteresis torque generating mechanism 60 is configured not to generate a hysteresis torque in the first range of torsion angle (of 0° to 1°) set to be less than the first angle, while the damper device 1 is in the second torsional condition. Specifically, the hysteresis torque generating mechanism 60 does not generate a hysteresis torque both in the course of transition from the torsion angle of 0° to the torsion angle of 1° and in the course of reverse transition from the torsion angle of 1° to the torsion angle of 0°.

Besides, the hysteresis torque generating mechanism 60 generates the first hysteresis torque in the second range of torsion angle (of 1° to 4°) set to be greater than or equal to the first angle and be less than the second angle. Specifically, the hysteresis torque generating mechanism 60 does not generate a hysteresis torque in the course of transition from the torsion angle of 1° to the torsion angle of 4° but generates a hysteresis torque both in the course of reverse transition from the torsion angle of 4° to the torsion angle of 3° and in the course of reverse transition from the torsion angle of 2° to the torsion angle of 1°.

Moreover, the hysteresis torque generating mechanism 60 generates the second hysteresis torque in the third range of torsion angle (of 4° to 5°) set to be greater than or equal to the second angle and be less than the third angle. Specifically, the hysteresis torque generating mechanism 60 generates a hysteresis torque both in the course of transition from the torsion angle of 4° to the torsion angle of 5° and in the course of reverse transition from the torsion angle of 5° to the torsion angle of 4°. It should be noted that the second hysteresis torque is greater in magnitude than the first hysteresis torque.

Furthermore, the hysteresis torque generating mechanism 60 generates the third hysteresis torque in the fourth range of torsion angle (of 5° to 7°) set to be greater than or equal to the third angle and be less than or equal to the maximum angle. Specifically, the hysteresis torque generating mechanism 60 generates a hysteresis torque in the course of transition from the torsion angle of 5° to the torsion angle of 7° but does not generate a hysteresis torque in the course of reverse transition from the torsion angle of 7° to the torsion angle of 5°. It should be noted that the third hysteresis torque is lesser in magnitude than the second hysteresis torque.

(b) The width of each support portion 301, 302, the width of each accommodation portion 401, 402, the length of each coil spring 51, or numeric values specifically set for the torsion angle are exemplary only and are not limited to the settings.

(c) In the preferred embodiment described above, all the coil springs are set to be equal in stiffness. However, coil springs herein used can be different in stiffness from each other.

(d) The number of accommodation portions, that of support portions, and that of coil springs are exemplary only and are not limited to those in the preferred embodiment described above.

(e) In the preferred embodiment described above, the hysteresis torque generating mechanism 60 includes the first bushing 61, the second bushing 62, the cone spring 63, and the friction plate 64. However, the configuration of the hysteresis torque generating mechanism 60 is not limited to this. For example, the hysteresis torque generating mechanism 60 may not include the second bushing 62 and the cone spring 63.

Furthermore or alternatively, the hysteresis torque generating mechanism 60 may not include the friction plate 64. In this case, what is only required is that, instead of the friction plate 64, the first bushing 61 is provided with the pair of protruding portions 641.

REFERENCE SIGNS LIST

1 Damper device
30 Input rotor
40 Hub flange
50 Elastic coupling part
60 Hysteresis torque generating mechanism

What is claimed is:

1. A damper device disposed between an engine and a drive unit, the damper device comprising:
    an input rotor disposed to be rotatable;
    an output rotor disposed to be rotatable relative to the input rotor;
    an elastic coupling part configured to elastically couple the input rotor and the output rotor; and
    a hysteresis torque generating mechanism configured to generate a hysteresis torque together with at least one of the input rotor or the output rotor therebetween, wherein the damper device is configured to be in a neutral condition when a torque is not transmitted thereto from both the engine and the drive unit, the damper device configured to be in a first torsional condition when the torque is transmitted thereto from the engine, the damper device configured to be in a second torsional condition when the torque is transmitted thereto from the drive unit, and the hysteresis torque generating mechanism is configured not to generate the hysteresis torque when the damper device is in the first torsional condition, the hysteresis torque generating mechanism configured not to generate the hysteresis torque in a first range of torsion angle when the damper device is in the second torsional condition, the first range of torsion angle set to be less than a first angle, wherein the hysteresis torque generating mechanism is configured to generate a first hysteresis torque in a second range of torsion angle when the damper device is in the second torsional condition, the second range of torsion angle set to be greater than or equal to the first angle and be less than a second angle, the hysteresis torque generating mechanism is configured to generate a second hysteresis torque in a third range of torsion angle when the damper device is in the second torsional condition, the second hysteresis torque greater in magnitude than the first hysteresis torque, the third range of torsion angle set to be greater than or equal to the second angle and be less than a third angle and the hysteresis torque generating mechanism is configured to generate the second hysteresis torque greater in magnitude than the first hysteresis torque in the third range and not to generate the hysteresis torque in a predetermined minute torsion angular range included in the third range when the damper device is in the second torsional condition.

2. The damper device according to claim 1, wherein the hysteresis torque generating mechanism is configured to generate a third hysteresis torque in a fourth range of torsion angle when the damper device is in the second torsional condition, the third hysteresis torque greater in magnitude than the second hysteresis torque, the fourth range of torsion angle set to be greater than or equal to the third angle and be less than or equal to a maximum angle.

* * * * *